United States Patent
Mondie et al.

(10) Patent No.: US 6,629,018 B2
(45) Date of Patent: Sep. 30, 2003

(54) SELECTIVE ADVANCE INTELLIGENT SINGULATOR

(75) Inventors: George R. Mondie, Beford, TX (US); Gerald A. Isaacs, Arlington, TX (US); Homer L. Dickerson, Fort Worth, TX (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 5 days.

(21) Appl. No.: 09/844,691

(22) Filed: Apr. 27, 2001

(65) Prior Publication Data

US 2002/0005333 A1 Jan. 17, 2002

Related U.S. Application Data

(60) Provisional application No. 60/200,663, filed on Apr. 28, 2000.

(51) Int. Cl.⁷ .......................... G06F 7/00; B65G 43/00; B65G 47/26; B65G 47/31
(52) U.S. Cl. ...................... 700/228; 700/229; 700/230; 198/460.1; 198/461.1
(58) Field of Search ............................ 198/461.1, 443, 198/444, 455, 456, 370.03, 459.8, 460.1; 209/900, 939; 700/228, 229, 230

(56) References Cited

U.S. PATENT DOCUMENTS

| | | |
|---|---|---|
| 3,155,218 A | 11/1964 | Creed |
| 3,592,326 A | 7/1971 | Zimmerle |
| 4,443,995 A | 4/1984 | Myers et al. ................. 53/443 |
| 4,756,400 A | 7/1988 | Funo et al. ................. 198/425 |
| 4,828,101 A | 5/1989 | Fluck ........................ 198/429 |
| 4,887,414 A | 12/1989 | Arena ........................ 53/543 |
| 4,925,005 A | 5/1990 | Keller ........................ 198/460 |
| 5,064,341 A | 11/1991 | Pippin |
| 5,141,097 A | 8/1992 | Oiry et al. ................... 198/460 |

(List continued on next page.)

FOREIGN PATENT DOCUMENTS

| | | | |
|---|---|---|---|
| DE | 198 36 764 A1 | 8/1998 | ......... B65G/47/12 |
| EP | 0 780 328 A1 | 6/1997 | ......... B65G/47/68 |
| EP | 0979788 | 2/2000 | |
| WO | WO 00/09428 | 2/2000 | ......... B65G/47/29 |
| WO | WO 00/76887 | 12/2000 | ......... B65G/43/08 |
| WO | 0174693 | 10/2001 | |

OTHER PUBLICATIONS

Interim Report for Phase I, U.S. Postal Service Contract 104230–85–H–002, Apr. 5, 1985, ElectroCom Automation, Inc.

Primary Examiner—Gene O Crawford
(74) Attorney, Agent, or Firm—Van Dyke, Gardner, Linn & Burkhart, LLP

(57) ABSTRACT

A singulator is disclosed for singulating the flow of articles in a conveyor system. The singulator includes a mechanism for actuating a portion of a conveyor to remove one item at a time from the conveyor end. A control system singulates items by selectively actuating portions on the conveyor underlying the items and extending toward the end of the conveyor. After one item has been singulated, another item is singulated when a gap between the trailing edge of the first item and a leading edge of the second hem reaches a predetermined size. This process repeats itself for singulating more articles.

28 Claims, 12 Drawing Sheets

U.S. PATENT DOCUMENTS

| | | | | |
|---|---|---|---|---|
| 5,167,315 A | * | 12/1992 | Doane | 198/456 |
| 5,360,306 A | | 11/1994 | Nakayama et al. | 414/331 |
| 5,372,238 A | * | 12/1994 | Bonnet | 198/455 |
| 5,415,281 A | * | 5/1995 | Taylor et al. | 198/448 |
| 5,531,311 A | | 7/1996 | LeMay et al. | 198/448 |
| 5,555,090 A | | 9/1996 | Schmutz | 356/381 |
| 5,638,938 A | | 6/1997 | Lazzarotti et al. | 198/445 |
| 5,667,055 A | | 9/1997 | Gambetti | 198/419.3 |
| 5,719,678 A | | 2/1998 | Reynolds et al. | 356/379 |
| 5,737,438 A | * | 4/1998 | Zlotnick et al. | 209/584 |
| 5,738,202 A | | 4/1998 | Ydoate et al. | 198/460.1 |
| 5,746,572 A | | 5/1998 | Winski | 414/796.3 |
| 5,765,676 A | | 6/1998 | Kalm | |
| 5,769,204 A | | 6/1998 | Okada et al. | 198/443 |
| 5,779,023 A | | 7/1998 | Hidai et al. | 198/418.1 |
| 5,810,158 A | | 9/1998 | Schiesser et al. | 198/809 |
| 5,810,550 A | | 9/1998 | Reaves | 414/788.1 |
| 5,918,723 A | | 7/1999 | Schuitema et al. | |
| 5,950,800 A | | 9/1999 | Terrell et al. | 198/448 |
| 5,979,636 A | * | 11/1999 | Vanacore et al. | 198/460.1 |
| 6,003,857 A | | 12/1999 | Salomon et al. | |
| 6,056,107 A | | 5/2000 | Schuitema et al. | |
| 6,131,372 A | | 10/2000 | Pruett | 53/448 |
| 6,253,905 B1 | * | 7/2001 | Pelka | 198/454 |
| 6,259,967 B1 | | 7/2001 | Hartlepp et al. | |
| 6,269,933 B1 | | 8/2001 | Schuitema et al. | |
| 6,305,525 B1 | * | 10/2001 | Miller et al. | 198/460.2 |
| 6,390,277 B2 | | 5/2002 | Pelka | |
| 6,401,936 B1 | | 6/2002 | Isaacs et al. | 209/656 |
| 6,443,292 B1 | | 9/2002 | Grund | 198/444 |
| 6,464,065 B2 | * | 10/2002 | Herubel et al. | 198/460.1 |
| 6,471,044 B1 | | 10/2002 | Isaacs et al. | |

* cited by examiner

SELECTIVE ADVANCE INTELLIGENT SINGULATOR

RELATED APPLICATIONS

This application is a conversion of provisional application Ser. No. 60/200,663, filed Apr. 28, 2000, the disclosure of which is incorporated herein by reference for all purposes.

TECHNICAL FIELD

The present invention relates to an apparatus, system and method of organizing a disordered stream of articles into an ordered stream of single items spaced from each other for subsequent processing.

BACKGROUND OF THE INVENTION

In high volume product handling operations, such as mail handling and similar processing, large quantities of items such as boxes, parcels packages or parts often varying widely in size, must be inducted into a sorter system. Typically, a feeder system for use in such processing areas takes a disordered stream of items fed to it on a conveyor and inducts the items onto a sorter system. The feeder system ideally should perform several functions. To the maximum extent possible, the feeder should singulate disordered items in order to present the articles to downstream processing equipment, such as a sorter, one at a time with some minimum specified spacing or separation between product items. The feeder system must also provide for the reading of destination information from the item so that the control system for the sort can track it through the system and sort it correctly. In the U.S., scannable bar codes are used for this purpose in automated systems. A third important function is intercepting and removing items which are non-machinable because they are too large, too heavy or the like from the system for special handling.

Singulation is an essential first step in the handling and sorting of product items such as boxes, parcels or soft packages. Material singulation as used herein means the generation of a flow of discrete pieces of material having no two pieces abreast, stacked, or having a gap or lineal (in the direction of flow) separation less than some minimum value. In other words, singulation is a process whereby a randomly input stream of items moving on a conveyor system is separated into a stream of single items spaced from each other so that a downstream process can readily perform operations on each item one at a time. Mixed item streams are a particular challenge in that a mixed material stream may include packages that vary greatly in size and may be piled at random one upon another, forming agglomerates of packages that are difficult to detect and separate.

Presently, singulation is accomplished in two ways, by manual manipulation of material on bulk conveying lines and with mechanical singulators that rely on the mechanical characteristics of the material being singulated to generate an output stream in which the probability that each piece is singulated is high. While manual operations can be relatively effective, they are costly; and high throughput, either continuous or in bursts, can exceed an individual's capacity, resulting in "doubles" or "multiples" (unsingulated output). Conventional mechanical singulation schemes vary widely in method, throughput, and error rates, but tend to be large (requiring a large amount of floor space) and subject to high error rates when handling material at the margins of the mechanical material specifications for which they are designed and/or tuned. They too tend to degrade in performance when they encounter heavy bursts of material flow.

According to one previously proposed method for singulation of mail, an inclined ramp with holes for applying suction is provided. Letters are allowed to slide down the ramp and then suction is applied to hold them in place on the slide. The suction is then selectively released in order to release one item at a time. See Interim Report For Phase I, U.S. Postal Service Contract 104230-85-H-0002, Apr. 5, 1985, ElectroCom Automation, Inc., pages 3–10 to 3–13. This method provide one form of singulation, but is of doubtful utility for larger items that maybe difficult to hold effectively using suction and that may tend to tumble down a slide, possibly evading the effect of suction and leaving the singulator prematurely. The system according to the present invention addresses these difficulties.

SUMMARY OF THE INVENTION

The selective advance intelligent singulator of the invention provides a means of generating a stream of single pieces of discrete material, such as cartons, from a single layer bulk flow, accumulation, or batch containing one or more of said pieces. It is used to convert a bulk material flow or batch to a stream of single items with controlled spacing on a conveying device such as may be needed for some process such as reading or sorting. It accomplishes accurate separation of a wide spectrum of pieces using knowledge of material boundaries acquired by various means, computer processing using a straightforward algorithm, and a suitable conveying mechanism to selectively pull material piece-by-piece from a single layered, bulk accumulation of pieces, i.e. with an intelligent process.

In one aspect, the invention provides a singulator including a conveyor for carrying a group of items from an entry end towards an exit end and an item detection system, such as a vision system, that captures image information associated with pieces of material along with the position of the pieces. The singulator includes a mechanism for selectively advancing selected items while retarding the advance of other items so that the forward motion of selected lead items can be controlled independently of the remaining pieces. A control system controls the operation of the conveyor or conveyor(s) and the mechanism for actuating the conveyor or conveyors in a manner effective to remove pieces from a group of pieces one at a time based upon the position of the piece or piece(s) and image information captured by the detection system.

Pieces are advanced in accordance with a removal scheme including the steps of: (1) selecting a first item for removal; (2) actuating one or more conveyors or conveyor sections underlying the selected piece and between the first item and the exit end of the conveyor in order to transport the first item to the exit end of the singulator at a velocity relative to the following pieces sufficient to create a gap between the first piece and the next piece where the following piece may have a velocity between zero and the exit velocity; (c) actuating one or more conveyors or conveyor sections underlying the next piece to be removed and between the next item to be removed and the exit end of the conveyor in order to transport the first item to the exit end of the singulator at a velocity relative to the following pieces sufficient to create a gap between that piece and the following piece; and (d) repeating step (c) for additional items.

A control system utilizes image and item position information derived from the detection system and the removal scheme to control operation of the conveyor and the mechanism for selectively advancing and retarding pieces so that the pieces exit from the singulator one at a time.

The conveyors or conveyor sections may comprise an array of independently controlled rotary carriers such as belts or rollers that allow movement of a velocity boundary across the singulator. The conveyor may also comprise one or more sliding conveyors or conveyor sections with extendable belts that also allow for movement of a velocity boundary across the singulator.

The principle advantage of the selective advance intelligent singulator is its capacity to reliably singulate bulk material in a number of embodiments adaptable to the throughput, material mix, cost, and other requirements of a particular encompassing system design. A selective advance intelligent singulator provides an accurate means of automating the singulation function in a compact machine capable of handling a wide spectrum of material without risk of increased error rates or otherwise degraded performance as flow fluctuates.

BRIEF DESCRIPTION OF THE DRAWINGS

The invention will hereafter be described with reference to the accompanying drawings, wherein like numerals denote like elements, and.

DETAILED DESCRIPTION

Figure 1:
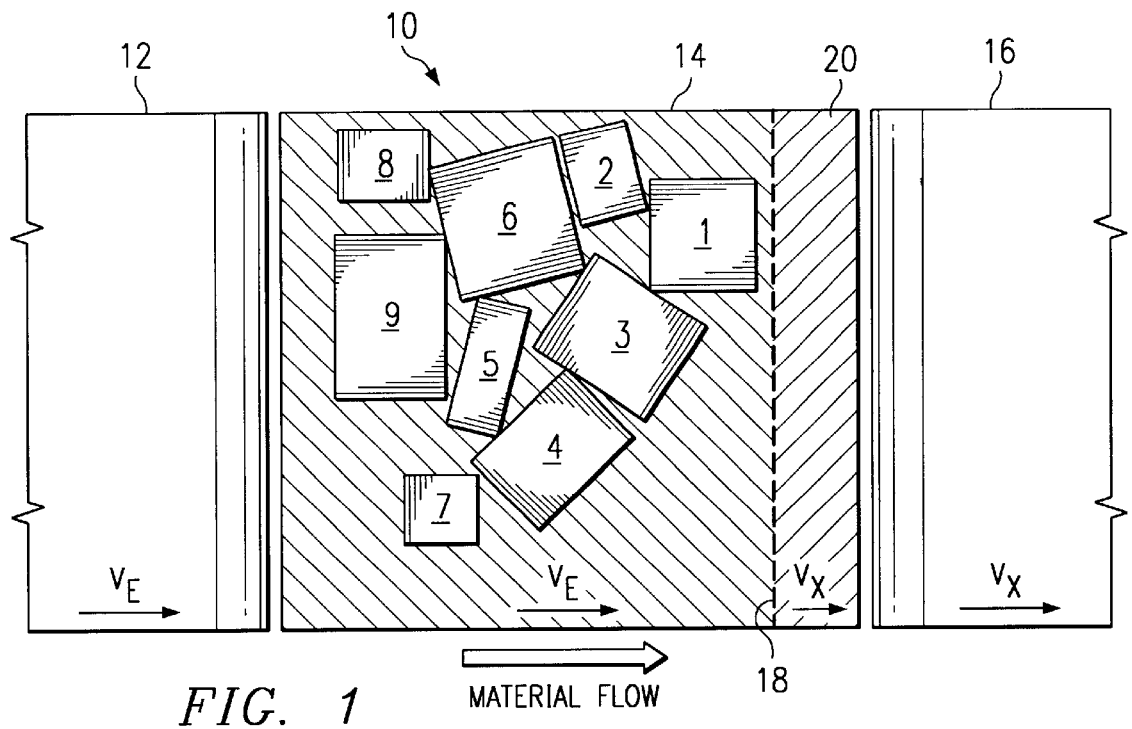
FIGS. 1–6 are partial schematic flow diagrams illustrating the flow of items in a batch mode embodiment of the invention.

A selective advance intelligent singulator according to the invention accomplishes accurate, wide-spectrum separation of pieces by using precise knowledge of material boundaries acquired by various means, computer processing, and a suitable mechanism to selectively pull material piece-by-piece from a single-layered, bulk accumulation of pieces. Knowledge of material boundaries and the mechanism which pulls material from a bulk accumulation can be accomplished by various means.

In one embodiment, the system uses a camera to generate image information for the bulk material immediately upstream from the singulator. Another embodiment uses an array of vertical distance measuring devices to accomplish the same objective. Yet another embodiment uses an array of physical presence and/or pressure sensing devices over which the material is conveyed to accomplish the same objective. This information is transformed via suitable algorithms into boundary information for each individual piece. Alternatively, in some situations the material may be placed in a known configuration immediately upstream from or directly onto the singulator. In this case it is possible to use data from the emplacing system, a data base, or both to generate boundary information.

One class of embodiments of the selective advance intelligent singulator processes bulk material in batches. In embodiments of this type, piece boundary information is acquired for a batch of material as it is moved onto the singulator. The singulator then holds all pieces except those that can be immediately released as singulated pieces gapped (spaced lineally) at least a specified distance apart. These pieces are conveyed forward immediately, and as soon as the distance from the trailing boundary of the moving pieces equals/exceeds the minimum gap, one or more additional pieces is released. This process continues until the batch is exhausted, at which time a new batch is positioned on the singulator. Specific embodiments in this class of embodiments use different conveying means to move a batch of material onto the singulator and to hold and release individual pieces.

In one embodiment of a batch process according to the invention a set of narrow belts is used to move accumulated material onto the singulator. The belts are decelerated to a low velocity or a full stop when the singulator is full, at which time a matrix of support mechanisms interleaved among the belts rises beneath all pieces or all pieces except those that can be immediately released, while the belts begin again to move forward.

As the released pieces, riding on the belts, move forward, supports are dropped (retracted) under successive additional pieces as required to achieve the desired gap, allowing them to be carried forward by the belts until the trailing piece wholly on the singulator begins moving forward. At this point, material accumulated upstream also begins moving forward refilling the singulator and beginning the next batch cycle. An apparatus suitable for practicing this mode of the invention is disclosed in copending application Ser. No. 540,371, filed Mar. 31, 2000, assigned to Siemens Electro-Com L.P., the disclosure of which is incorporated herein for all purposes.

FIGS. 1–6 schematically illustrate an apparatus 10 and the steps for batch singulation in accordance with the invention. A stream of pieces 1–9 are conveyed via infeed conveyor 12 at entry velocity $V_e$ onto singulator 14. Pieces 1–9 are conveyed from the singulator with takeaway conveyor 16 at exit velocity $V_x$. The velocity boundary between $V_e$ and $V_x$ is schematically represented by line 18.

As shown in FIG. 1, in step 1 of the process, accumulated pieces of material are moved fully onto the singulator 14. Conveying means 20 on the singulator such as belts or rollers move the accumulated batch of pieces 1–9 at entry velocity $V_e$ until the singulator 14 is full or near full. $V_e$ then drops to zero.

Figure 2:
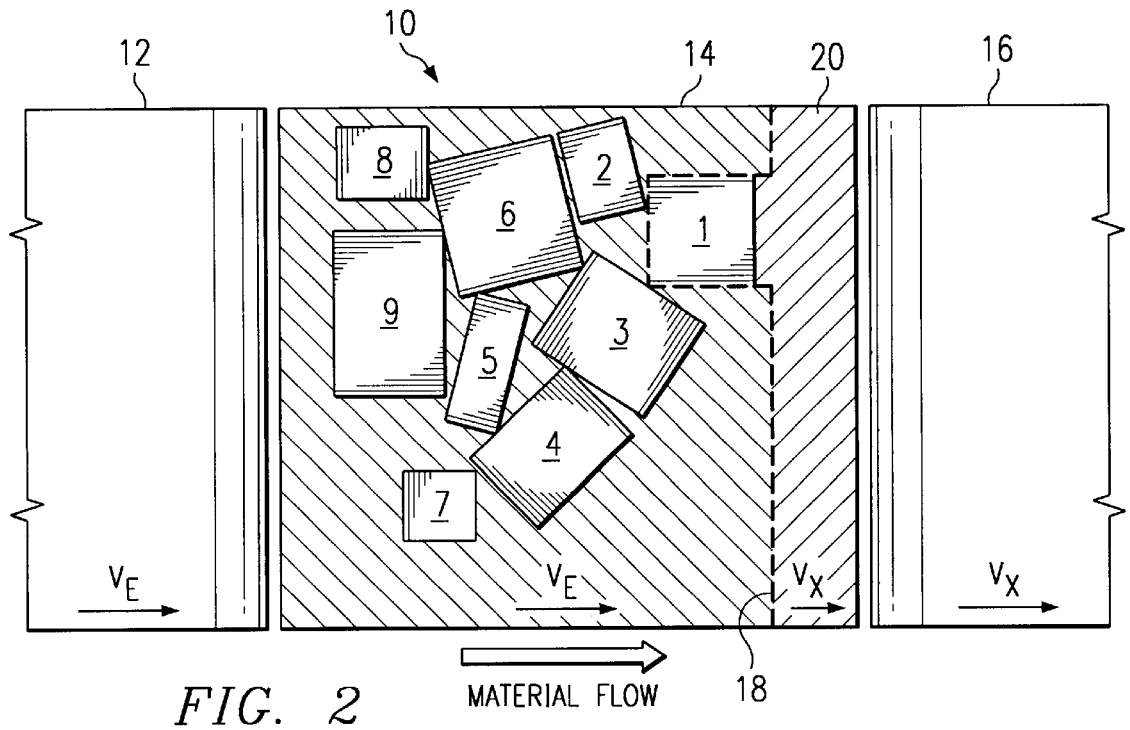

In FIG. 2, the boundary between entry and exit velocities of the conveying means on the singulator has been extended forward to the trailing edge of the first piece selected for advancement. The selected piece accelerates to exit velocity and moves forward away from the remainder of the stationary batch of accumulated items.

Figure 3:
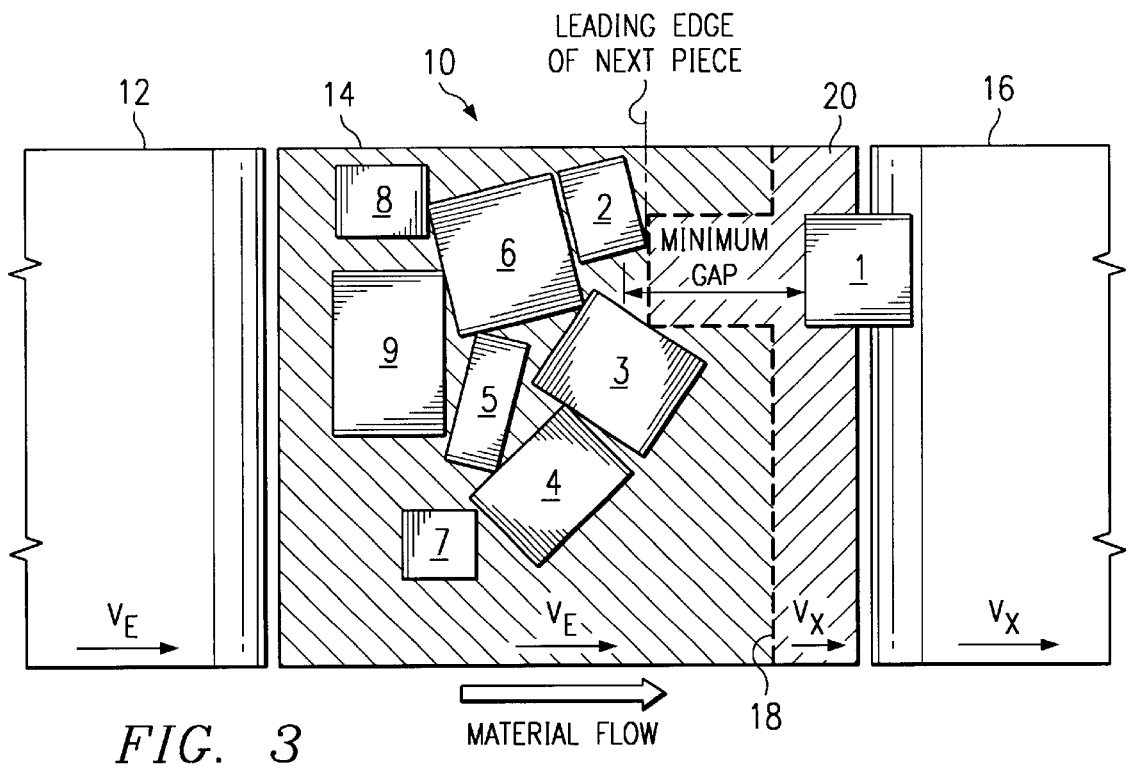

Turning to FIG. 3, the first selected piece moves forward with no change in the velocity boundary 18 until the gap between its trailing edge and the leading edge of the second selected piece reaches a specified minimum value (minimum gap). $V_e$ remains zero.

Figure 4:
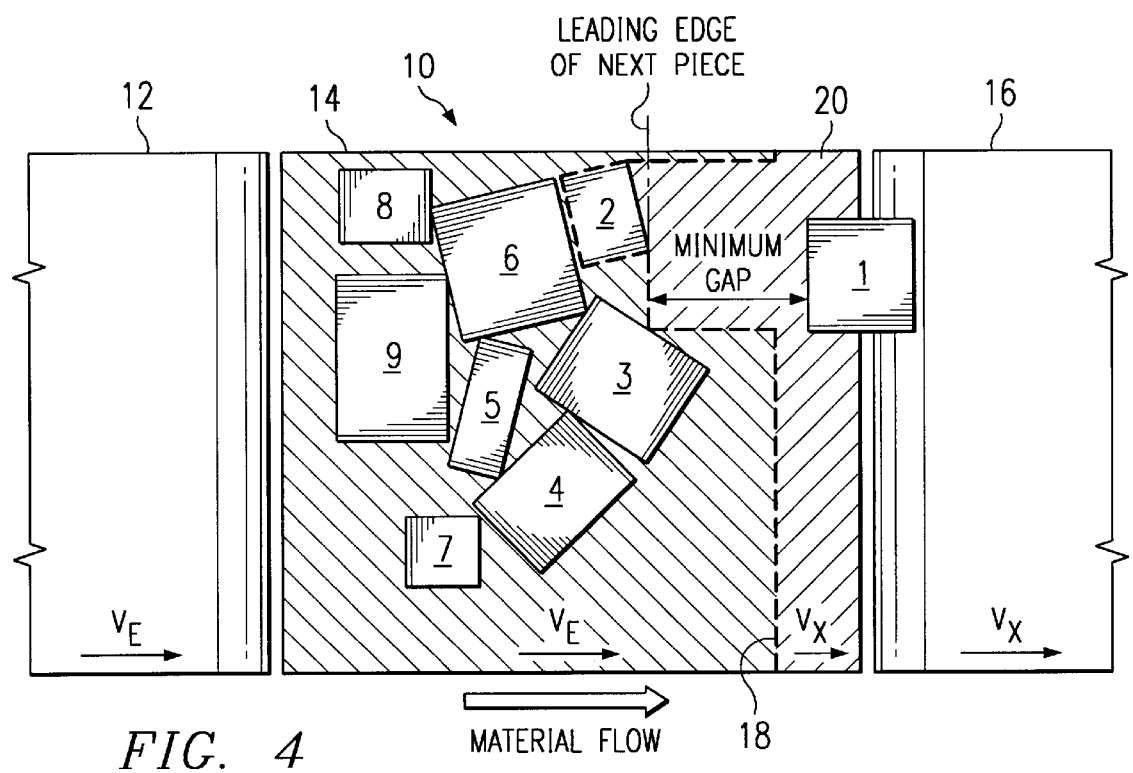

When, as shown in FIG. 4, the minimum gap is achieved between the first and second pieces, 1 and 2, respectively, the velocity boundary of the singulator's conveying means is again extended, this time to the trailing edge of the second selected piece.

Figure 5:
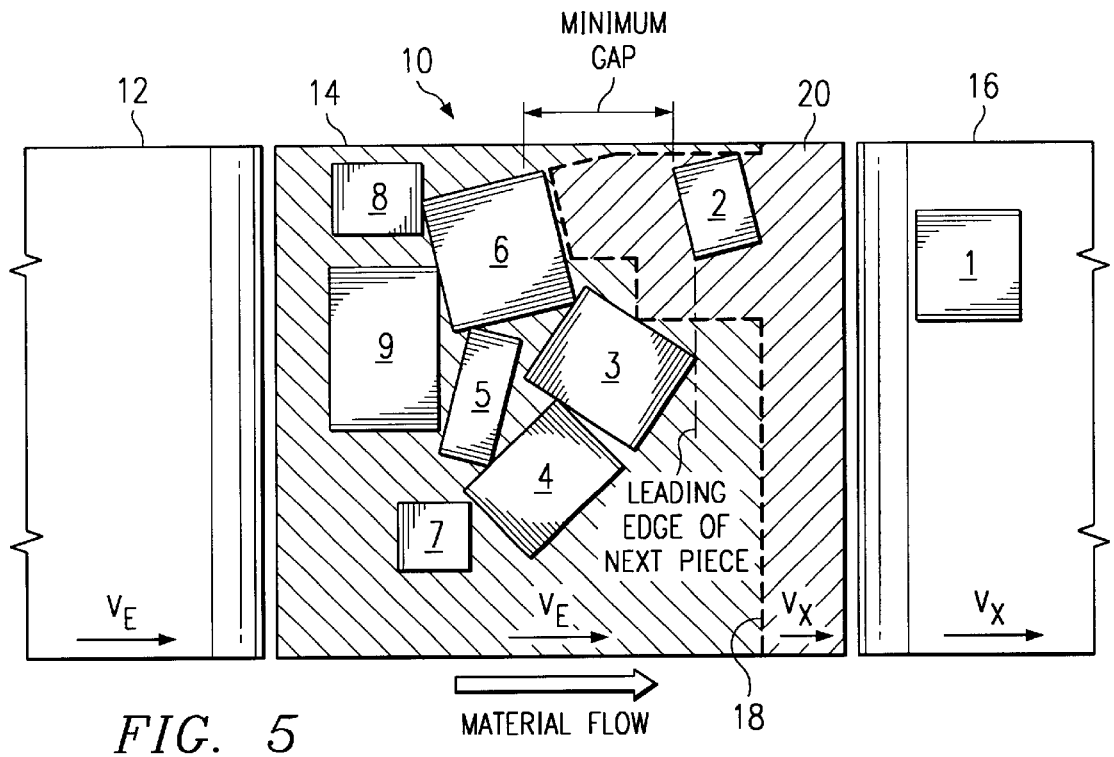

As shown in FIG. 5, the first and second selected pieces move forward, with no change in the velocity boundary, until the gap between the trailing edge of the second selected piece and the leading edge of the third selected piece, pieces 2 and 3, respectively, reaches the specified minimum value.

Figure 6:
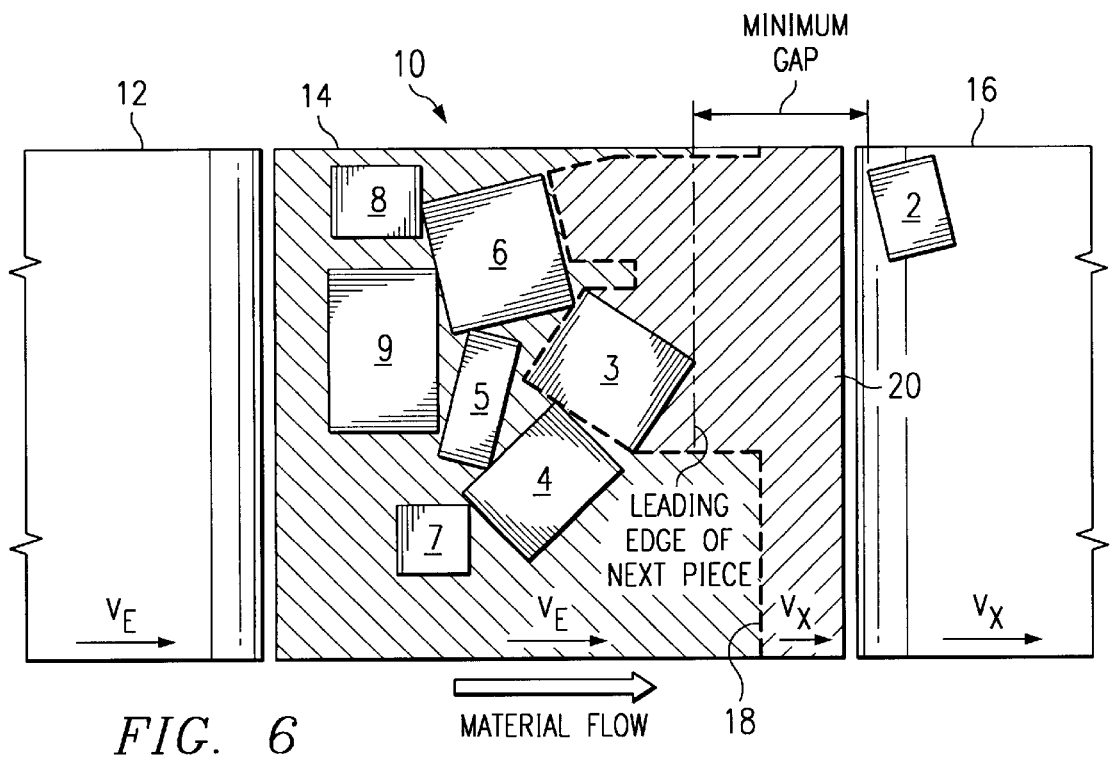

Next, as shown in FIG. 6, when the minimum gap between the second and third pieces is attained, the velocity boundary 18 of the singulator's conveying means is again adjusted, this time to the trailing edge of the next selected piece. The process of extending the velocity boundary and waiting, if necessary, until the minimum gap is attained, is repeated until the last piece filly positioned on the singulator 14 has begun to move at exit velocity $V_x$. At this point $V_e$ again becomes a non-zero, positive value, moving the next accumulation of pieces onto the singulator and beginning the next batch cycle. In the special case wherein an incoming stream of pieces which has already been singulated and wherein the required gap is present between all of the pieces, there is no necessity for batch processing as described above as long as at any instant the boundary information for individual pieces is known and processed for all pieces on the singulator and in a zone upstream from the singulator. In this case no batch of material is defined and $V_e$ remains constant. In such a case there is no reason internal to the singulator 14 for $V_e$ ever to be less than $V_x$ so that a piece of material enters and exits the singulator 14 with no change in velocity.

Another class of embodiments of the selective advance intelligent singulator processes bulk material continuously. In embodiments of this type, piece boundary information is acquired for some predefined distance upstream from the forward most unsingulated piece. Bulk material is advanced onto the singulator at a controlled entry velocity less than or equal to singulator exit velocity until the trailing edge of the piece identified as next to be singulated is fully on the active portion of the singulator. At this point, the selected piece is moved at exit velocity until the required gap between it and the following piece is attained. Entry velocity is adjusted to ensure that the gap can be achieved and to ensure that, as long as the input rate can equal or exceed the output rate, the next piece is always available for extraction (transfer to exit velocity) at the time needed to achieve the desired gap. Note that this means that the ratio of entry velocity to exit velocity is variable.

One continuous process embodiment uses a discrete matrix of rollers or belts, each of which can be independently engaged to one of two drive mechanisms. One drive mechanism moves at a varying rate so as to move the belts or rollers engaged to it at entry velocity. The other drive mechanism moves at a constant rate so as to move belts or rollers engaged to it at exit velocity. In this embodiment, the individual belts or rollers in the matrix are selectively engaged to the appropriate drives so as to advance the bulk material onto the singulator at entry velocity until the trailing edge of the piece identified as next to be singulated is fully on it. At this point, the belts or rollers under the selected piece and extending downstream to the end of the singulator are engaged to the exit velocity drives. The speed of the entry velocity drive is varied to ensure that, if possible, the trailing edge of the next piece will be fully on the singulator when the required gap between this and the following piece is attained. When two conditions are met: 1) the minimum gap has been achieved, and 2) the trailing edge of the next piece is fully on the singulator; the belts or rollers then under the second piece are engaged to the exit velocity drive mechanism. This process is then repeated for each successive piece. An example of how continuous processing embodiments work is given in FIGS. 7–12.

Another class of embodiments of the selective advance intelligent singulator of the invention is a variant of the preceding continuous mode embodiment. In embodiments of this type, although the entry velocity varies over time, the exit velocity varies with it such that there is a fixed ratio between the entry velocity and the exit velocity. Bulk material is advanced onto the singulator at a controlled entry velocity until the trailing edge of the piece identified as next to be singulated is fully on the active portion of the singulator. At this point, the selected piece is moved at exit velocity until the required gap between it and the following piece is attained. Entry velocity is adjusted to insure that the gap can be achieved and to ensure that, as long as the input rate can equal or exceed the output rate, the next piece is always available for extraction (transfer to exit velocity) at the time needed to achieve the desired gap. One continuous process embodiment uses a matrix of rollers or belts, each of which can be made to move at one of two velocity ratios with respect to a common drive mechanism. The drive mechanism moves at a varying rate so as to move the belts or rollers engaged to it at the entry ratio to properly move material onto the singulator. Selectively coupling rollers or belts to move at the higher velocity ratio permits pulling a gap between the currently selected item and the next to be singulated. At the downstream end of the singulator, a conveying mechanism with a velocity equal to or greater than the higher singulator velocity receives and transports the singulated material.

As in the previously described embodiment, the individual belts or rollers in the matrix are selectively engaged to the appropriate drives so as to advance the bulk material onto the singulator at entry velocity until the trailing edge of the piece identified as next to be singulated is fully on it. At this point, the belts or rollers under the selected piece and extending downstream to the end of the singulator are engaged to the exit velocity drives. The speed of the entry velocity drive is varied to ensure that, if possible, the trailing edge of the next piece will be fully on the singulator when the required gap between this and the following piece is attained. When two conditions are met: 1) the minimum gap has been achieved, and 2) the trailing edge of the next piece is fully on the singulator; the belts or rollers then under the second piece are engaged to the exit velocity drive mechanism. This process is then repeated for each successive piece. In principle, fixed-ratio continuous processing embodiments work as shown in FIGS. 7–12 though successful design of such embodiments are more sensitive to belt speeds, singulator length, and material arrival rates and sizes.

FIGS. 7–12 schematically illustrate an apparatus 30 and the steps for continuous singulation in accordance with the invention. A stream of pieces 1–9 are conveyed via infeed conveyor 32 at entry velocity $V_e$ onto singulator 34. Pieces 1–9 are conveyed from the singulator with takeaway conveyor 36 at exit velocity $V_x$. The velocity boundary between $V_e$ and $V_x$ is schematically represented by line 38.

Figure 7:
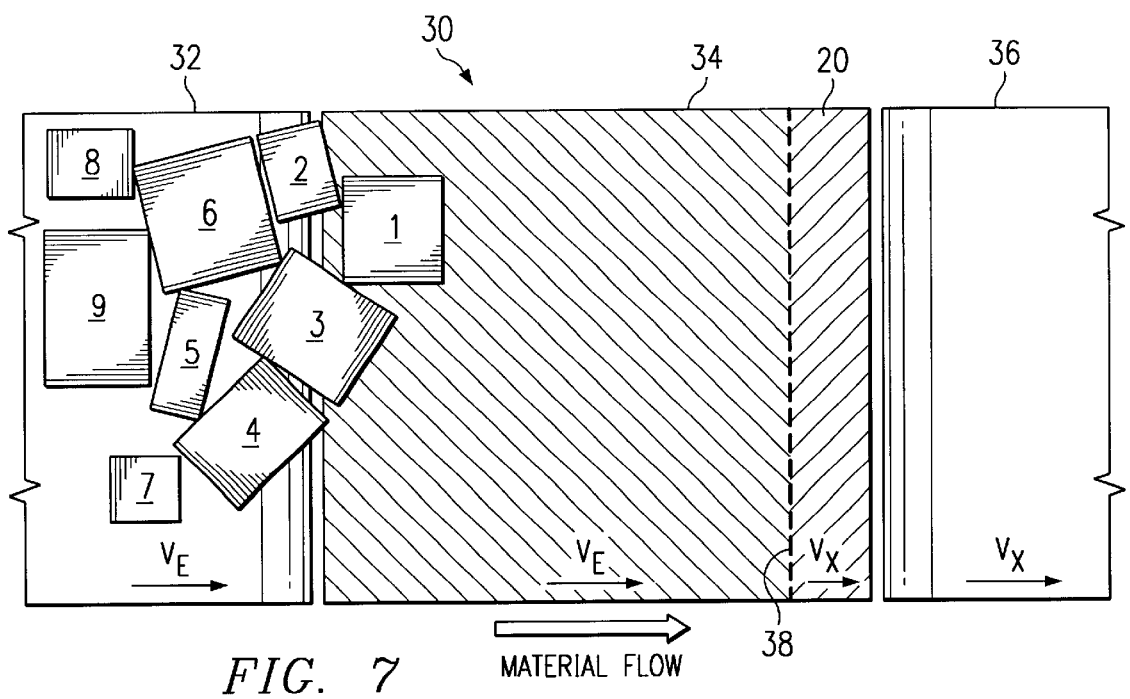
FIGS. 7–12 are partial schematic flow diagrams illustrating the flow of items in a continuous mode embodiment of the invention according to the invention.

Turning now to FIG. 7, accumulated material, e.g. pieces 1–9, are moved partially onto singulator 34. Conveying means 20 on the singulator such as belts or rollers move the accumulated batch of material at entry velocity $V_e$ until at least one piece is fully on the singulator 34, in other words until the trailing edge of at least one piece is on the active portion of the singulator. $V_e$ is controlled at or less than $V_x$.

Figure 8:
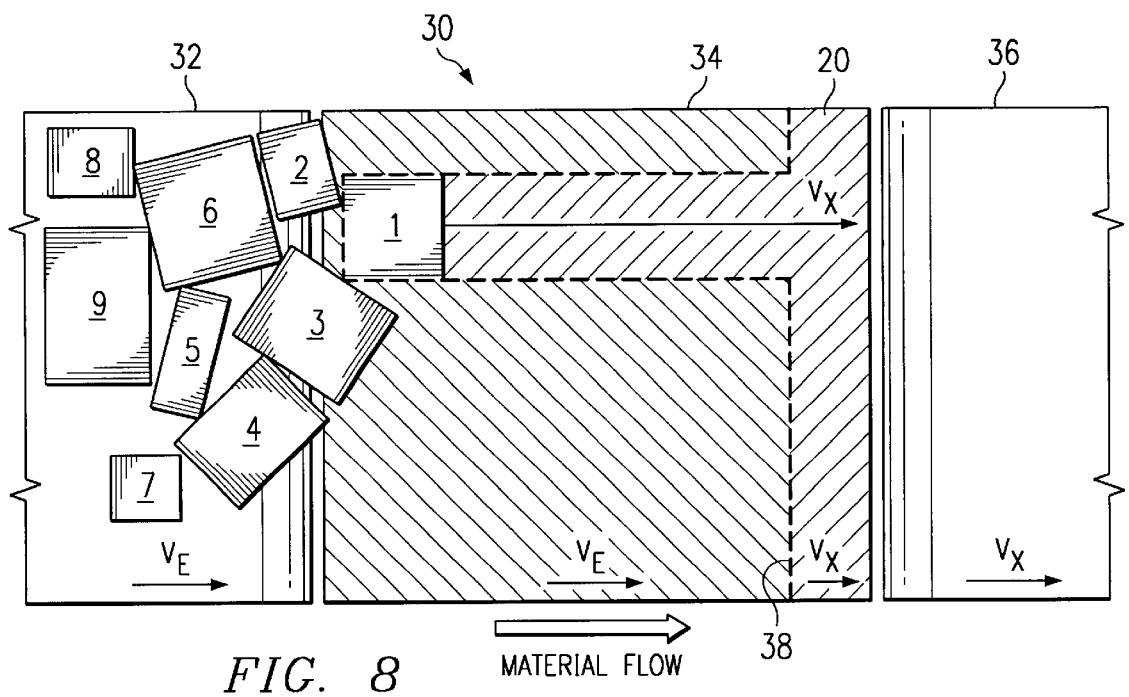

As shown in FIG. 8, the boundary between entry and exit velocities of the conveying means on the singulator is extended forward to the trailing edge of the first piece selected. The selected piece is accelerated to $V_x$ and moves forward. $V_e$ may be varied between zero to $V_x$, but if the gap between piece 1 and 2 is less than the specified minimum gap, as illustrated, $V_e$ is reduced to less than $V_x$ after the location of the trailing edge of the second selected piece is known.

Figure 9:
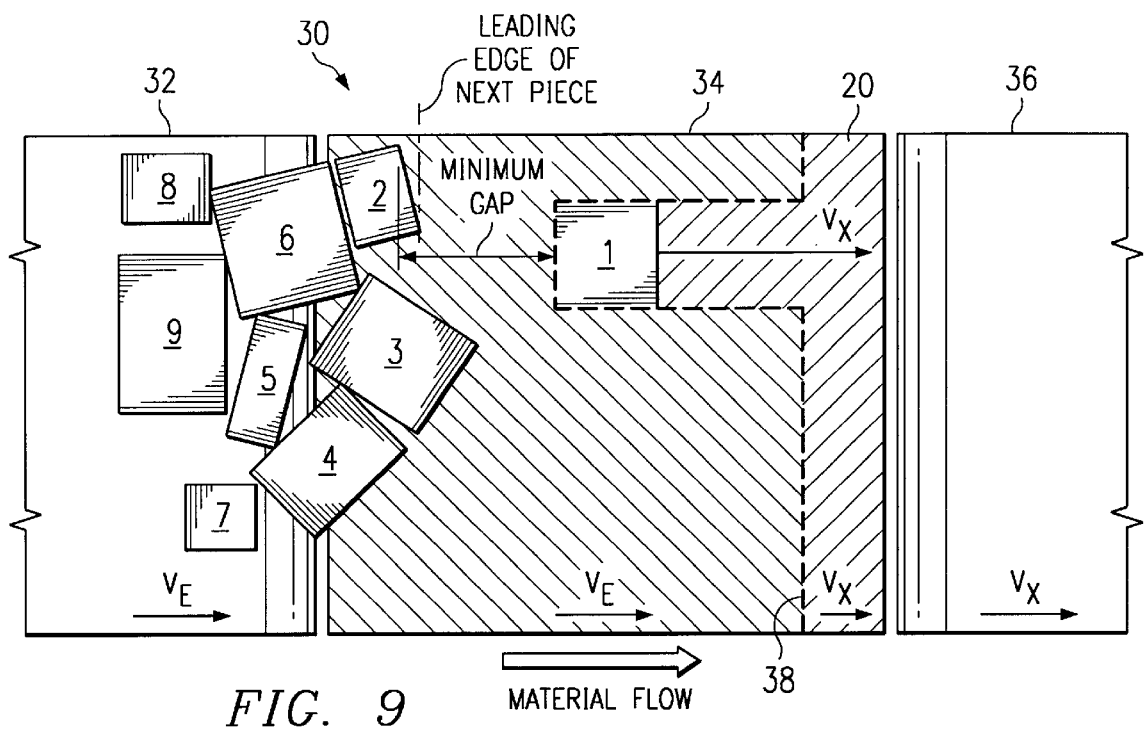

As shown in FIG. 9, the first selected piece moves forward while the velocity boundary 38 follows it until the gap between its trailing edge and the leading edge of the second selected piece reaches a specified minimum value. $V_e$ must be controlled and varied between zero and $V_x$ as required to expeditiously achieve two objectives. First, the gap between the first and second pieces, 1 and 2, respectively, needs to be opened to the specified minimum gap. Second, the second piece needs to be advanced until its trailing edge is fully on the singulator 34.

Figure 10:
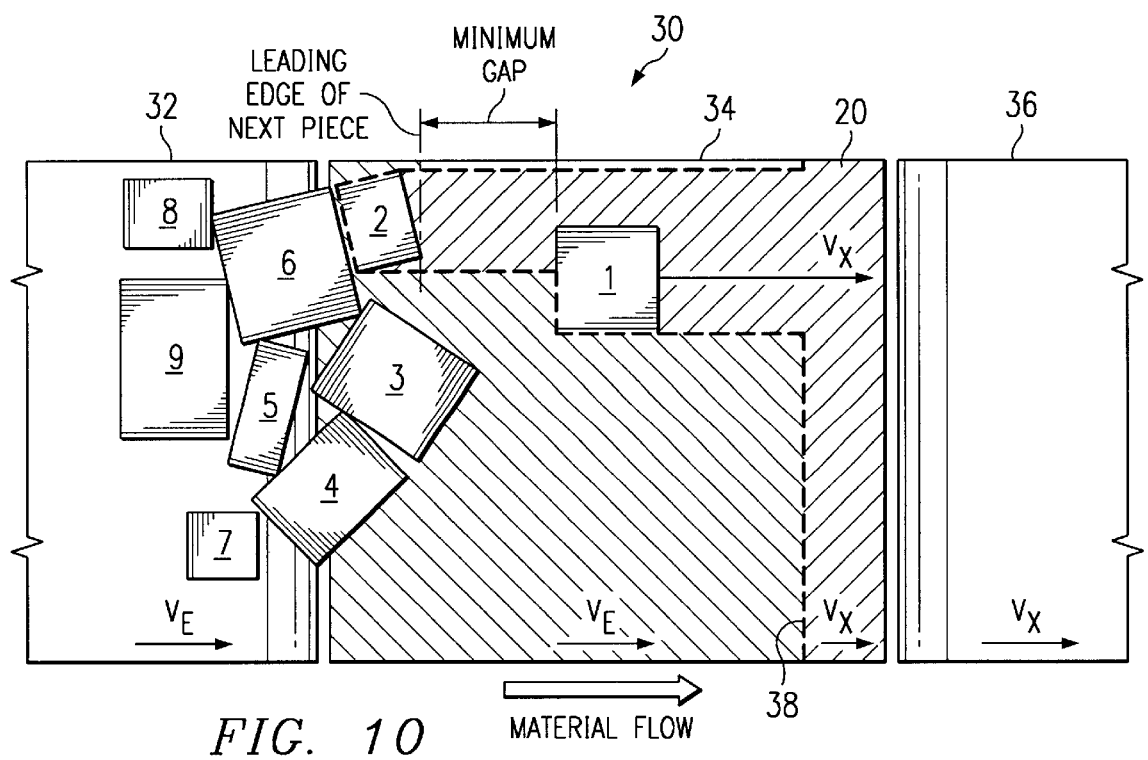

Referring now to FIG. 10, when the minimum gap between the first and second piece, 1 and 2 respectively, is achieved, the velocity boundary 38 of the singulator's conveying means 40 is again extended, this time to the trailing edge of the second selected piece.

Figure 11:
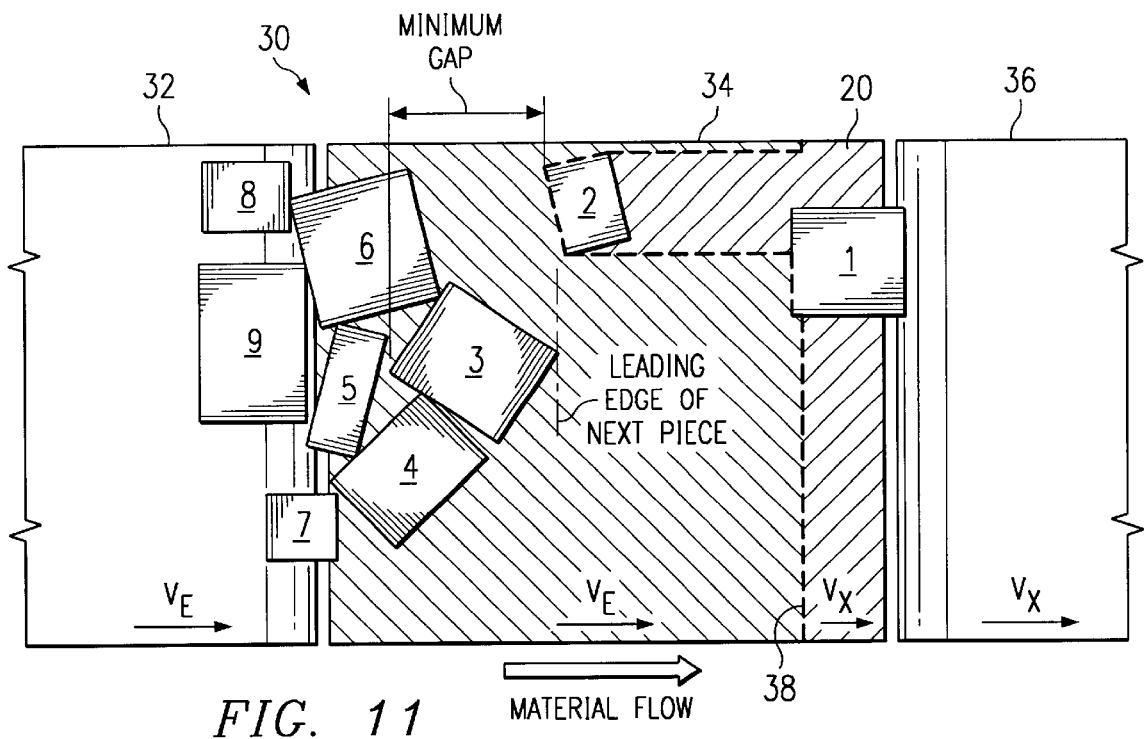

As illustrated in FIG. 11, the first and second pieces, 1 and 2, respectively, move forward while the velocity boundary moves with their trailing edges until the gap between the trailing edge of the second selected piece and the leading edge of the third selected piece reaches a specified minimum value. Again, $V_e$ is varied between zero and $V_x$ as required to open the gap between the second and third pieces, 2 and 3 respectively, and to advance the third piece until its trailing edge is fully on the singulator 34.

Figure 12:
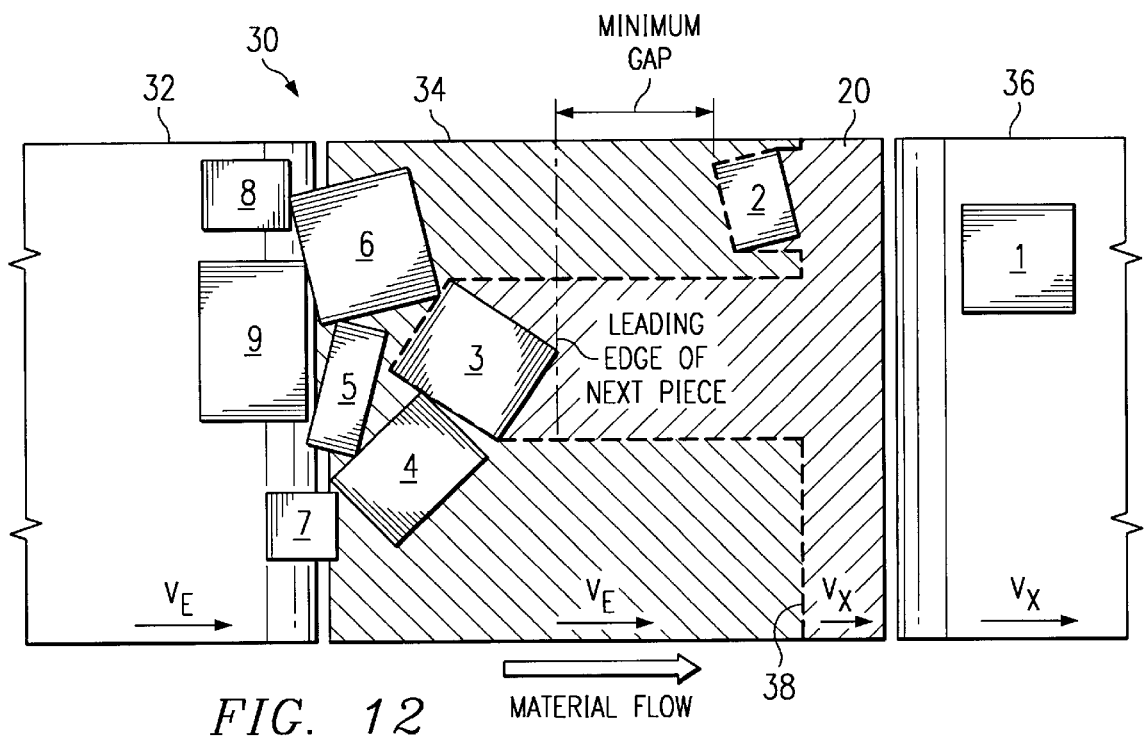

Turning to FIG. 12, when the minimum gap between pieces two and three is attained, the velocity boundary of the singulator's conveying means is again extended, this time to the trailing edge of the third selected piece. The process of extending the velocity boundary, then simultaneously opening a gap and moving the next piece fully onto the singulator 34 continues indefinitely. In the special case of an incoming stream of pieces that are already singulated, e.g. have the required minimum gap between the pieces, the singulator responds by moving the velocity boundary to the trailing edge of each piece as soon as it is fully on the singulator 34. In this case there is no reason internal to the singulator for $V_e$ ever to be less than $V_x$ so that a piece of material enters and exits the singulator 34 with no change in velocity.

The output corresponding to maximum throughput of a batch mode embodiment of the selective advance intelligent singulator approximates a stream consisting of groups of pieces spaced at the desired gap, with the spacing between groups determined by the specific entry and exit belt velocities and other design details and criterial of the singulator and its system context. The output corresponding to maximum throughput of a continuous mode embodiment of the selective advance intelligent singulator approximates a continuous stream of pieces spaced at the desired gap, assuming the design of the system context does not limit the availability or input velocity of bulk material. Thus, maximum throughput of a batch embodiment is a function of exit velocity, gap length, and the gap between groups imposed by the cyclic deceleration of incoming material while the maximum throughput of a variable ratio continuous embodiment is a function of exit velocity and gap length only. The maximum throughput of a fixed ratio continuous embodiment is also a function of arrival and takeaway rates, material density (pieces per unit area of conveying surface), and singulator length.

Thus, the selective advance intelligent singulator according to the invention reliably singulates bulk material in a number of embodiments adaptable to the throughput, material mix, cost, and other requirements of a particular encompassing system design. The following descriptions of specific embodiments of the conveying surface of the singulator illustrate the range of potential design options. Note that all continuous mode embodiments can be either fixed- or variable-ratio except those specifically designated as fixed-ratio. Actuation means can in general be electrical or pneumatic bi-position actuators at each "point" or a motor-driven mechanical assembly that controls a whole (longitudinal) column of "points". Also disclosed are a number of different means (FIGS. 15–20) for coupling or (clutching) the driven belt or roller to its driver.

Figure 13:
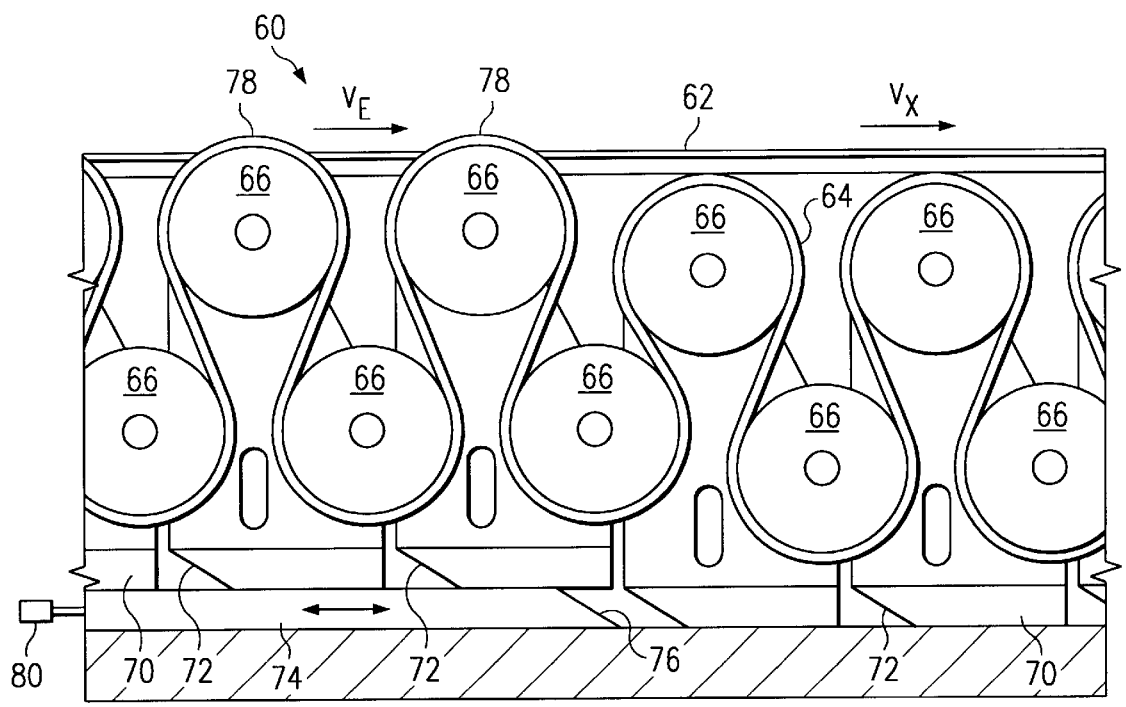
FIG. 13 is a partial side view of a raised belt conveyor according to an aspect of the invention.
Figure 13A:
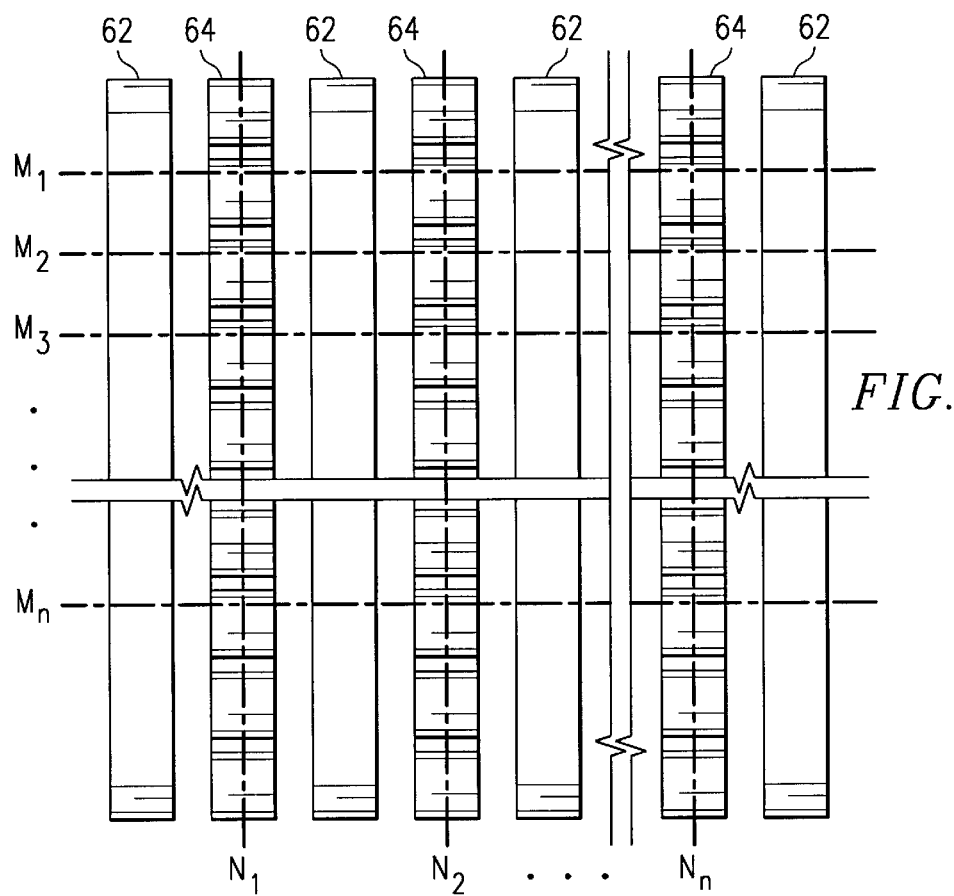
FIG. 13A is a partial top view of a raised belt conveyor according to an aspect of the invention.

Referring now to FIGS. 13 and 13A, a raised belt continuous mode apparatus 60 corresponding to one embodiment of the conveying means 20 is disclosed. In embodiments of this type, narrow slider belts 62, supported by a flat, low-friction surface, and driven at one velocity, either entry velocity $V_e$ or exit velocity $V_x$, are interleaved with narrow belts 64, such as elastic "O" belts, driven at the other velocity. The second set of belts 64 are wrapped in serpentine fashion around pairs of rollers 66 as shown in FIG. 13. The upper surface of a serpentine belt is normally slightly below that of the slider belts 62. Engagement of the serpentine belt with the bottom surface of conveyed material is achieved by raising a selected roller pair so that the upper surface 78 of belt 64 is raised slightly above the surface of the adjacent slider belts 62. In the illustrated embodiment, columns 70 are each provided with an inclined face 72 that is engaged by an inclined surface 76 of cam member 74 as the member is advanced, raising the column. This raises the pair of rollers 66 associated with the column 70 until the upper surface of belt 64 is above the adjacent slider belts 62. Actuating the cam member 74 to raise roller pairs 66 can be achieved by electrical means, such as a solenoid 80, a pneumatic or hydraulic cylinder, a motor using a screw-type drive or other mechanical means. As best shown in FIG. 13A, the velocity boundary using a raised belt embodiment may be moved by raising a pair or pair(s) of rollers 66, each corresponding to longitudinal column or column(s) n consisting of m roller pairs. Thus, only n actuators are required as opposed to m×n, where m represents the number of lateral rows of columns.

Figure 14:
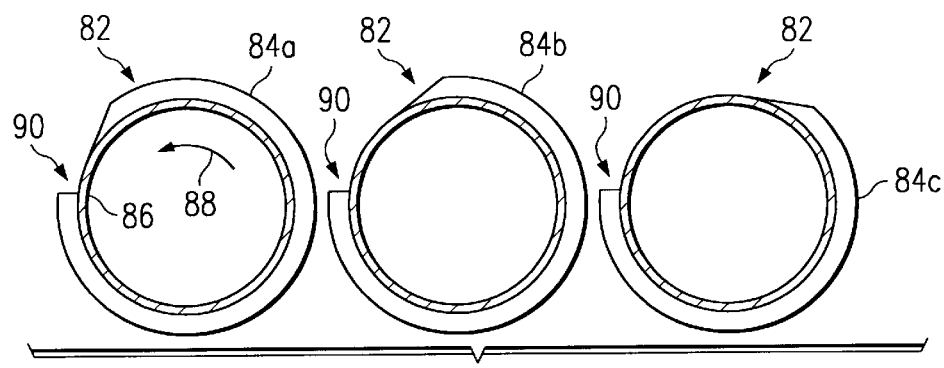
FIG. 14 is a partial side view of a cam apparatus for use in connection with a conveyor according to the invention.

FIG. 14 illustrates an alternate cam member 82 for use in connection with the embodiment illustrate in FIG. 13 is illustrated. As shown, cam members 84(a)–84(c) are arranged along the length of tube 86, each tube corresponding to a successive column or columns 70 and each cam member corresponding to a row. As will be appreciated, as the tube 86 is rotated in the direction indicated by arrow 88, cams 84(a)–84(c) will successively engage corresponding columns, raising the corresponding roller pair or pairs. As will also be appreciated, when the tubes 86 are rotated through 360° to the location designated by arrows 90, to the cams 84(*a*)–84(*c*) will simultaneously disengage allowing all of the columns corresponding to belt 64 to lower at one time. Tubes 86 may be actuated and rotated with an electric solenoid or motor, a hydraulic or pneumatic cylinder or other mechanical or electrical devices, depending upon the application.

Figure 15:
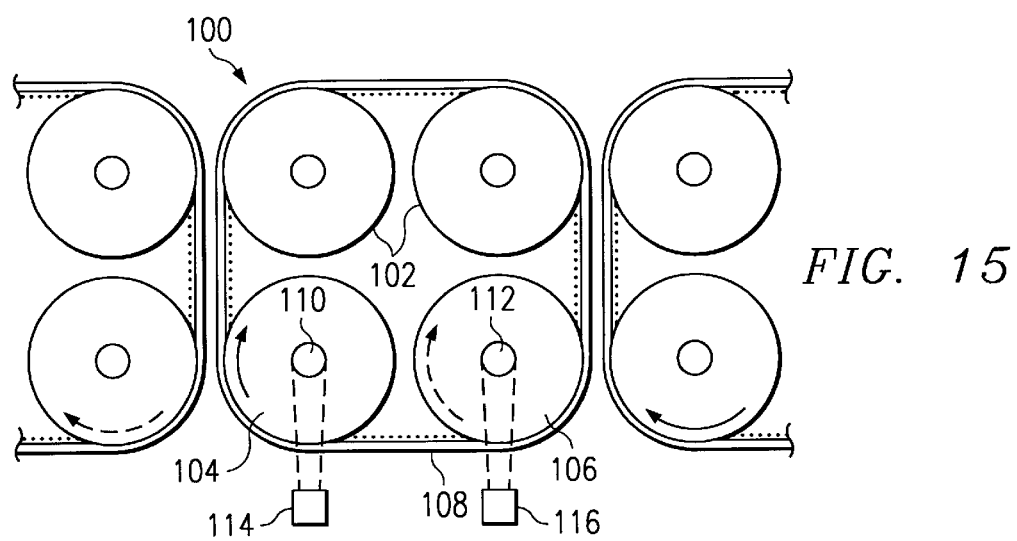
FIG. 15 is a partial schematic of a belt type conveyor apparatus according to the invention.

FIG. 15 illustrates a locally-clutched belt continuous mode apparatus 100 corresponding to another embodiment of conveying means 20. In this embodiment, the bed or upper surface of the singulator 34 is populated with an array or matrix of short belts 108. Each belt 108 is wrapped around two idler rollers 102 that the conveyed material, and two clutched drive rollers, 104 and 106. Each of the drive rollers 104 and 106 is mounted on a shaft, 110 and 112, respectively, rotating at a speed associated with either entry or exit velocity. Clutches 114 and 116 corresponding to drive rollers 104 and 106 are selectively engaged or disengaged to cause the belt to move at the appropriate velocity. For example drive roller 104 may be configured to operate at a constant velocity where as drive roller 106 maybe configured to operate at a controlled speed. The drive for each belt 108 is intelligently selected, either constant velocity or controlled velocity, to move one or more parcels downstream at the constant velocity while retarding others as required to achieve a downstream flow of single pieces separated by a controlled minimum gap as discussed in connection with FIGS. 7–12. As used herein, the terms "intelligence" and "intelligently" refers generally to the use of a means of capturing and generating image information for pieces such as a camera or vision system or an array of physical measuring devices such as photocells, pressure sensors, and similar devices, information that is transformed via suitable algorithms into boundary information for individual piece and subsequently used by a computer or microprocessor to control the operation of discrete elements such as apparatus 100.

Figure 16:
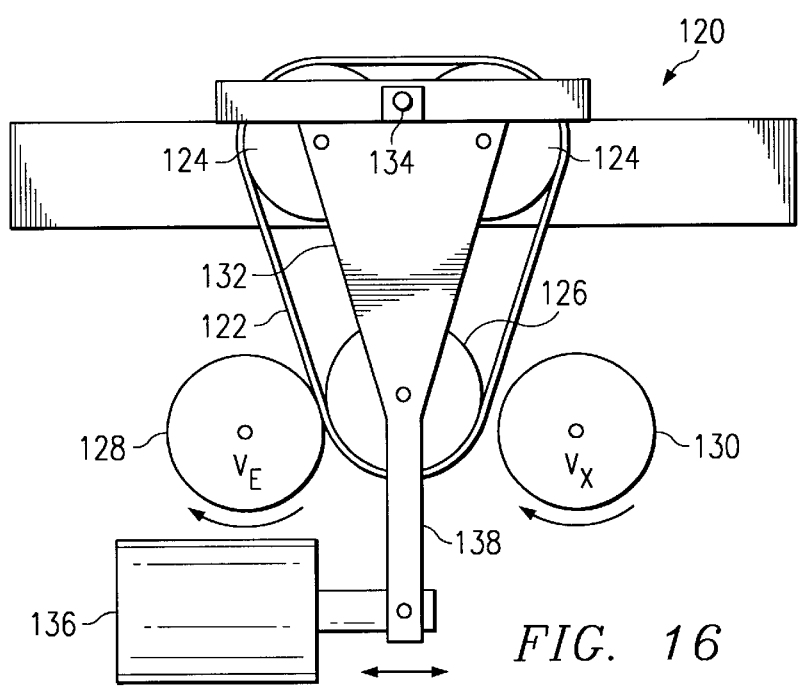
FIG. 16 is a partial side view of a first alternative belt type conveyor apparatus according to the invention.

FIG. 16 shows a three-roller locally driven belt continuous mode apparatus 120, comprising another alternative embodiment of conveying means 20, is shown. In this embodiment, the singulator bed is populated with an array of short belts 122 that support conveyed material. Each belt 122 is wrapped around two idler rollers 124 that support the weight of the conveyed material and a third idler roller 126 well below the surface of the bed. As shown, idler rollers 124 and 126 are mounted on a frame 132. Frame 132 is in turn pivotable around drive engagement pivot pin 134. A solenoid 136 or similar actuator is coupled to a lower section of frame 132 in order to selectively pivot the frame. Drive rollers 128 and 130 are mounted adjacent to lower idler roller 126 and are operated at rotational speeds corresponding to entry velocity $V_e$ and exit velocity $V_x$, respectively.

As will be appreciated, actuator 136 may selectively pivot frame 132 causing belt 122 to be engaged by either of drive rollers 128 and 130, surfaces of which are moving at either entry velocity or exit velocity, where the belt wraps around idler roller 126. Thus, the drive for each belt 122 maybe intelligently selected, corresponding to either entry velocity $V_e$ or exit velocity $V_x$, to move one or more parcels downstream while retarding others as required to achieve a downstream flow of single pieces separated by a controlled minimum gap as discussed in connection with FIGS. 7–12

Figure 17:
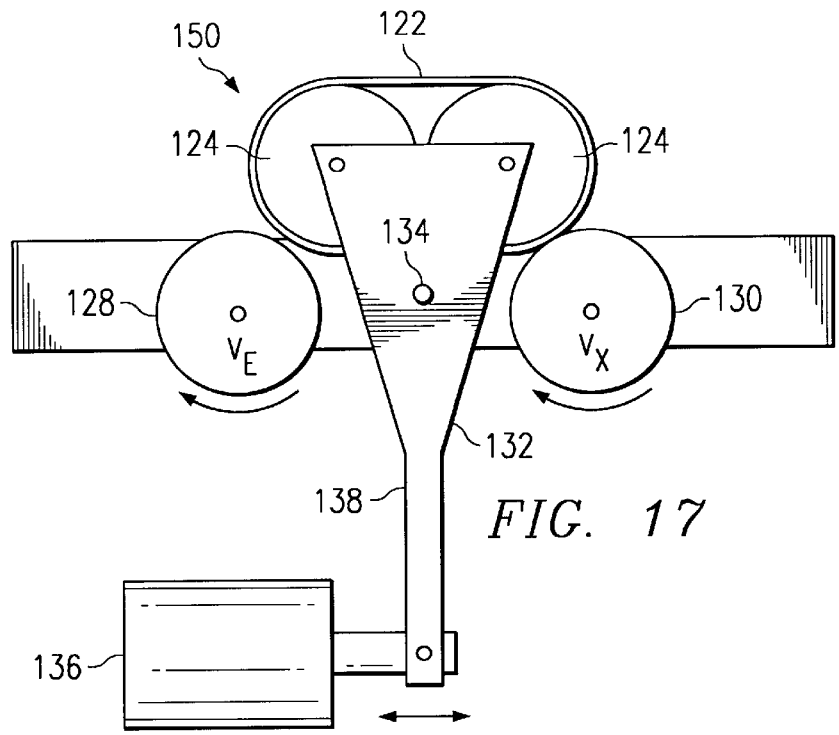
FIG. 17 is a partial side view of a second alternative belt type conveyor apparatus according to the invention.

FIG. 17 illustrates a two-roller locally driven belt continuous mode apparatus corresponding to yet another embodiment of conveying means 20. The apparatus 150 is in all respects similar to the apparatus shown in FIG. 16 with the exception that the third idler belt 126 of apparatus 120 is omitted. Instead, each belt 122 is wrapped around two idler rollers 124 that support the weight of the conveyed material. Where belt 122 wraps around each of the idler rollers 124 the belt may be selectively engaged either of drive rollers 128 and 130 whose surfaces is moving at entry velocity $V_e$ and exit velocity $V_x$, respectively, by means of actuator 136 pivoting frame 132.

Figure 18:
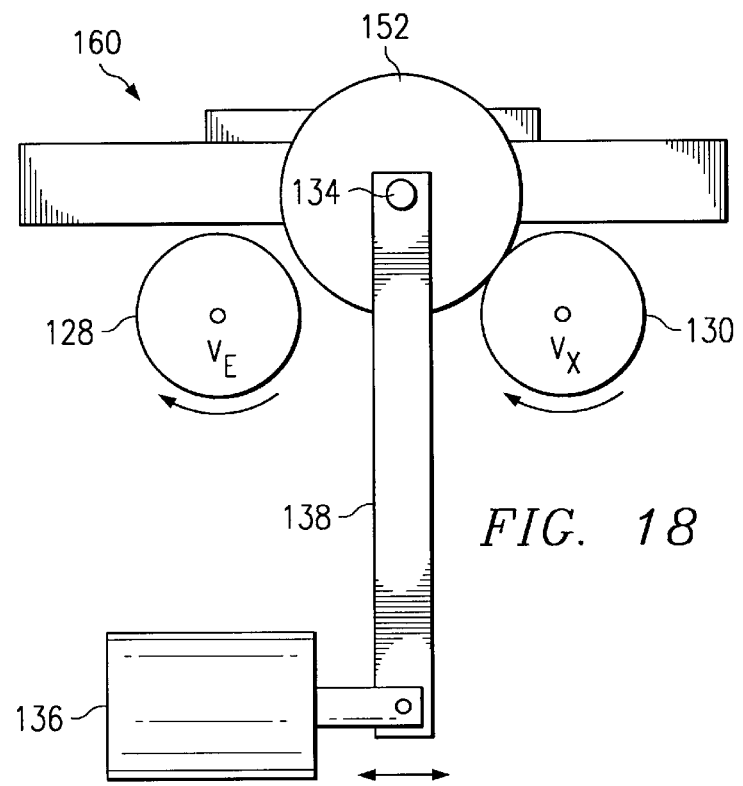
FIG. 18 is a partial side view of a roller type conveyor apparatus according to the invention.

FIG. 18 illustrates a locally driven roller continuous mode apparatus 150 corresponding to an additional embodiment of conveying means 20. In this embodiment, the bed of the singulator is populated with an array of rollers 152 that support conveyed material. Each roller 152 is moveable for engagement with either drive roller 128 whose surface is moving at entry velocity $V_e$ or with a drive roller 128, whose surface is moving at exit velocity $V_x$. Thus, the drive for each locally driven roller apparatus 160 may be intelligently selected, corresponding to either entry velocity $V_e$ or exit velocity $V_x$, to move one or more parcels downstream while retarding others as required to achieve a downstream flow of single pieces separated by a controlled minimum gap as discussed in connection with FIGS. 7–12.

Figure 19:
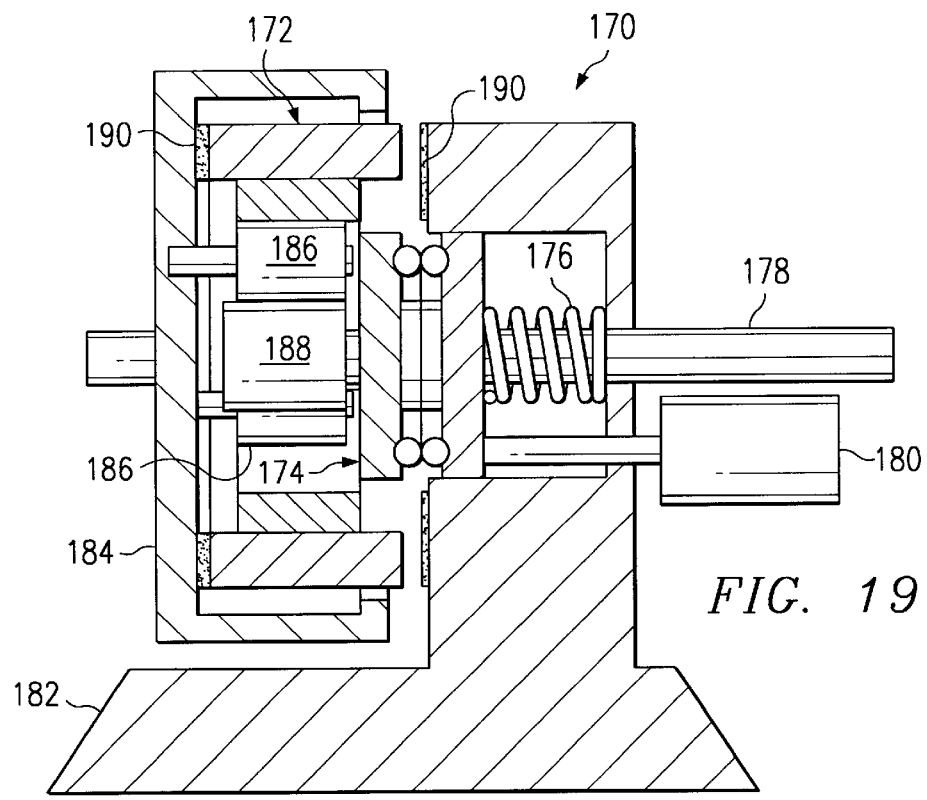
FIGS. 19–19A are a partial cross-section of a multiple speed conveyor drive apparatus according to the invention.
Figure 19A:
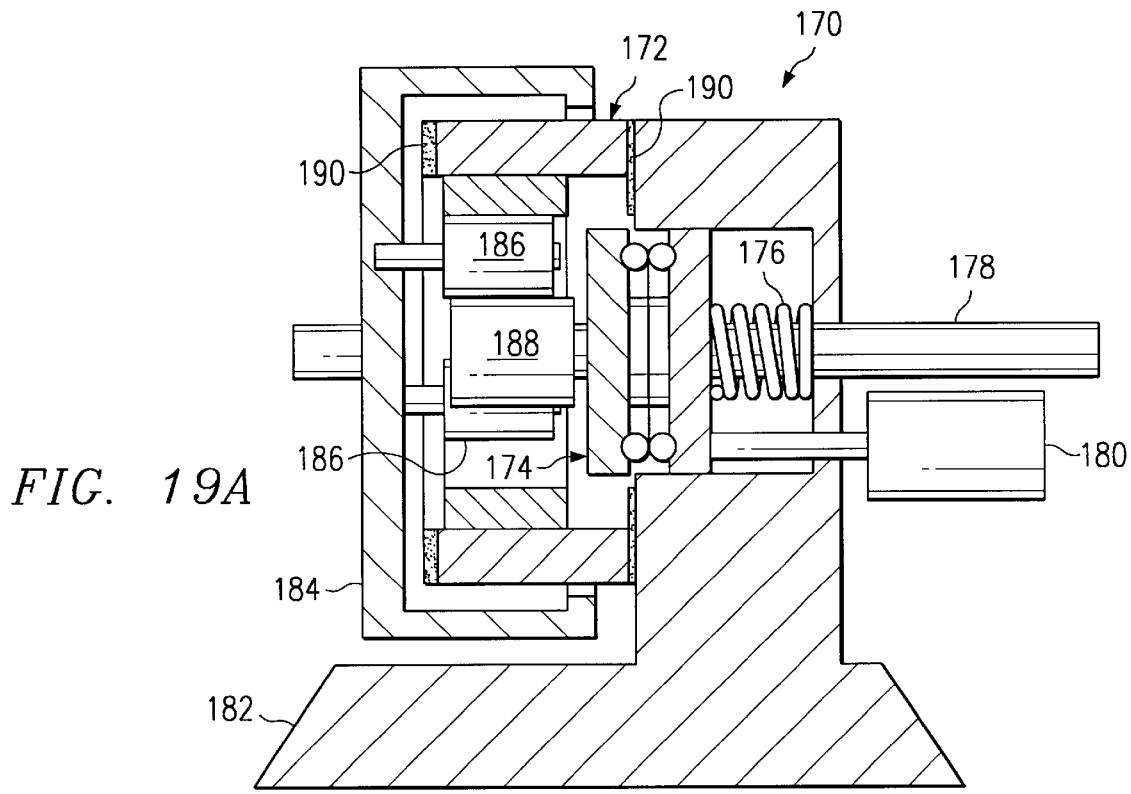

FIGS. 19 and 19A illustrate a drive 170 for a fixed ratio belt continuous apparatus. In this embodiment a planetary mechanism, gear or friction engaged, and two clutches in a drive roller are used to generate two velocities from a single drive shaft. The planetary drive includes drive shaft 178, frame 182, an outer rotational element (gear or roller) 172, a clutch engagement element 174, clutch pads 190, an inner rotational element (gear or roller) 188 coupled to drive shaft 178, middle rotational elements (gears or rollers) 186 and a planetary middle rotational element (axles and dual speed roller). An actuator such as a solenoid or hydraulic or pneumatic cylinder 180 actuates the clutch for engagement between the outer planetary element and the middle element for shaft velocity or between the outer planetary element to the frame for low velocity as shown in FIG. 19A.

Figure 20:
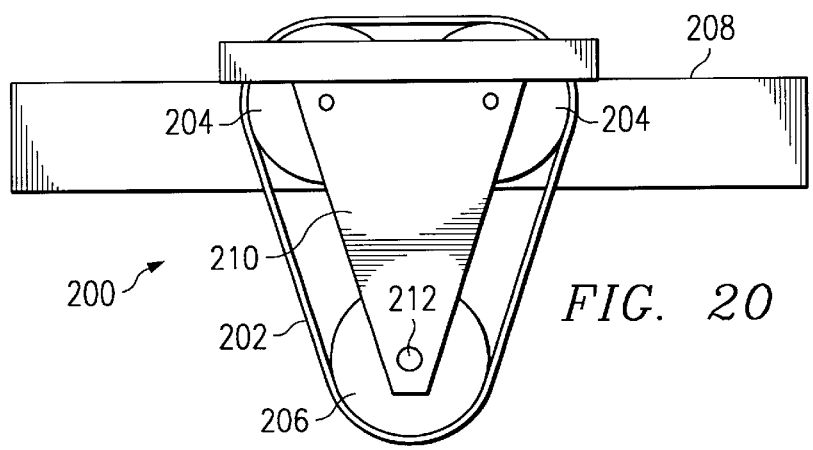
FIG. 20 is a partial side view of a dual velocity belt type conveyor according to the invention.

FIG. 20 illustrates a fixed-ratio belt continuous apparatus that is yet another embodiment of conveying means 20 for use in connection with the singulator of the invention. Conveying belt 202 passes over a pair of idler rollers 204 and dual-velocity drive roller 206, all of which are mounted in a roller/belt frame 210. Dual-velocity drive roller 206 includes a drive shaft 212 for coupling the drive roller to a two-speed drive, such as the planetary drive illustrated in FIGS. 19 and 19A In this embodiment, planetary mechanism 170 (gear or friction engaged) is used to generate two velocities from a single drive shaft. Thus, each fixed-ratio belt apparatus 170 maybe intelligently driven at one of the two speeds corresponding to the outputs of the planetary drive 170 by means of actuator 180, to move one or more parcels downstream while retarding others as required to achieve a downstream flow of single pieces separated by a controlled minimum gap.

Figure 21:
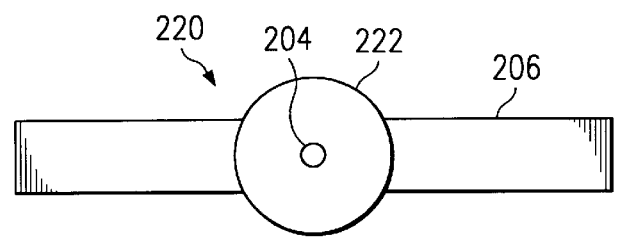
FIG. 21 is a partial side view of a dual velocity roller conveyor for use in connection with the invention.

FIG. 21 illustrates a fixed ratio roller continuous apparatus 220 corresponding to a further embodiment of conveying means 20. The apparatus includes a dual-velocity drive roller 222 mounted in a supporting structure 206. The drive roller 222 includes a drive shaft 204 that maybe coupled to a two-speed drive such as the planetary apparatus illustrated in FIGS. 19 and 19A and operated in the same fashion described above in connection with the fixed-ratio belt apparatus 200 illustrated in FIG. 20.

Figure 22:
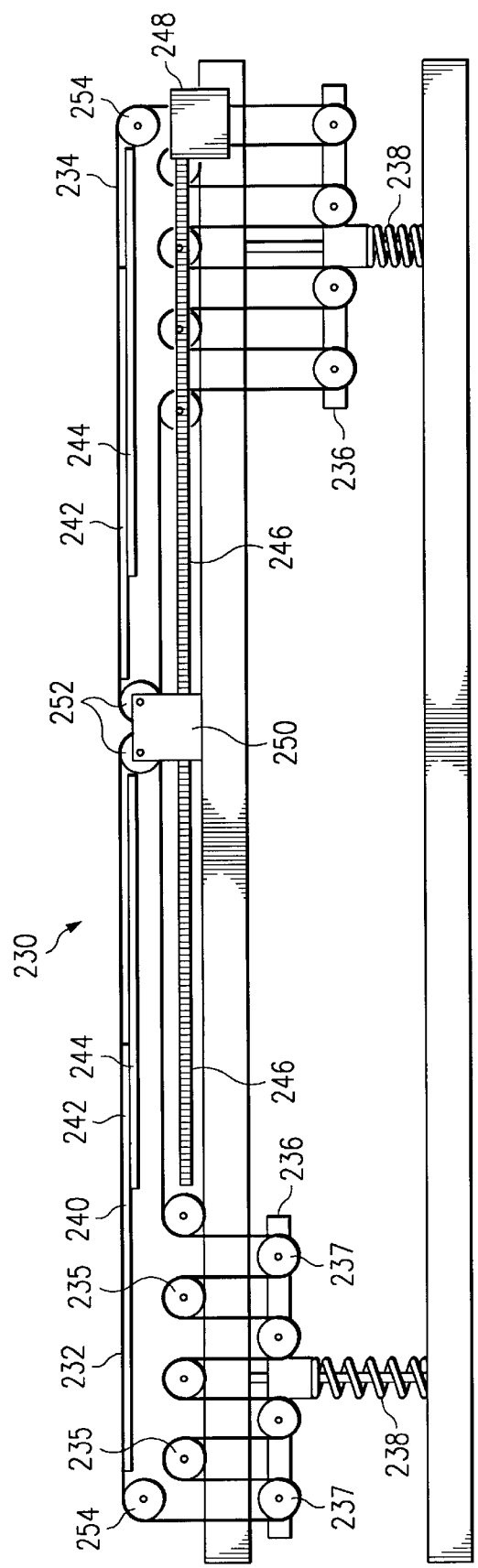
FIG. 22 is a partial side view of a extendable belt type conveyor apparatus according to the invention.

Turning now to FIG. 22, there is illustrated a sliding boundary continuous conveying apparatus 230 for use as an embodiment of conveying means 20. As shown, the apparatus 230 includes extendable belts 232 and 234 operating at entry velocity $V_e$, and exit velocity $V_x$, respectively. As will be appreciated, embodiments of the invention using this type of conveying means are based not on an array of discrete points (FIG. 23), but on a set of long, narrow columnar structures that support two narrow in-line belts, one driven at entry velocity and the other at exit velocity.

Each of belts 232 and 234 pass around boundary idler rollers 252, end rollers 254 that maybe drive rollers, and through a series of tension rollers 237 and idler rollers 235 in a serpentine path. Tension rollers are 237 are mounted in a moveable frame 236 that is spring-loaded by spring 238 to allow for take up and let out of the belts 232 and 234 as the boundary support 250 is moved longitudinally by means of screw drive 246. Each of belts 232 and 234 is supported by a slider belt support 240 which as shown includes overlapping sections 242 and 244 that may be moved relative to each other by screw drive 246. Screw drive 246 is actuated by screw drive motor 248 which in turn is intelligently controlled to vary the position of boundary support 250 that in turn moves the boundary 18 (FIG. 7) so as to move one or more selected pieces downstream in the manner discussed in connection with FIGS. 7–12 to achieve a downstream flow of single pieces separated by a controlled minimum gap.

Figure 23:
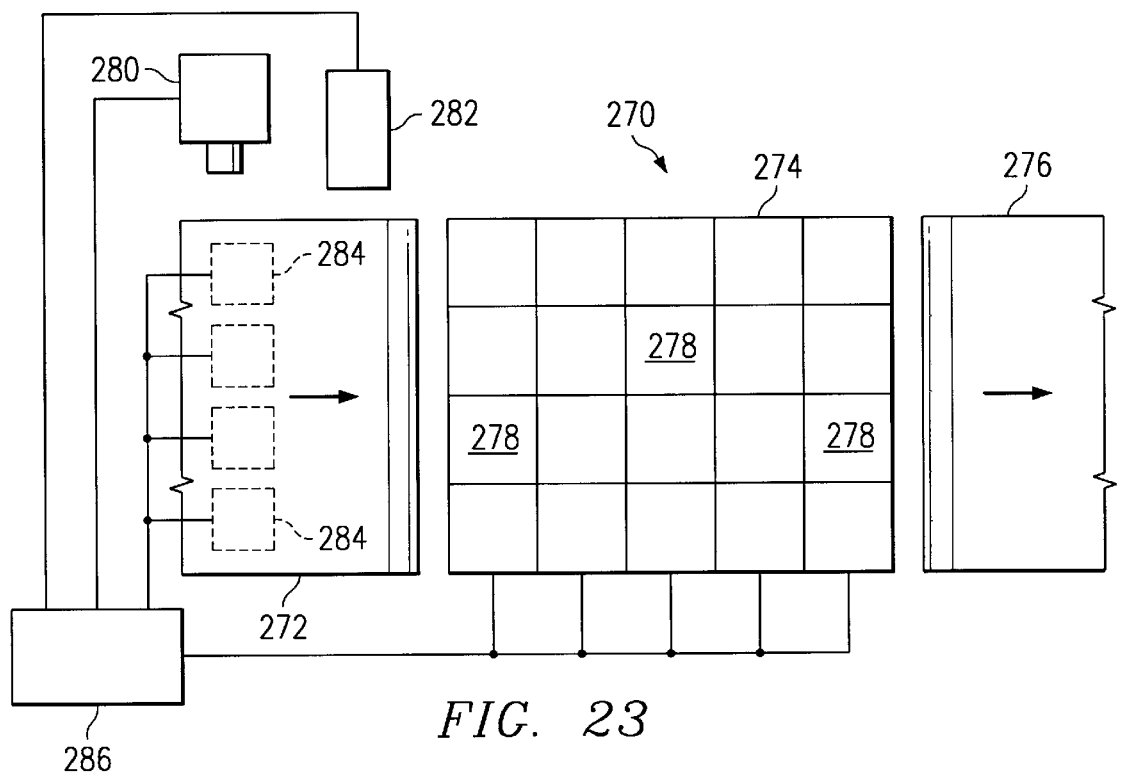
FIG. 23 is a schematic illustration of one embodiment of a control system for use in connection with the invention.

FIG. 23 schematically illustrates a control system 270 for use in connection with the selective advance intelligent singulator. As shown, a feed conveyor 272 upstream of singulator 274 is equipped with image information capturing devices (detection system) such as one or more cameras 280, and/or vertical and/or horizontal sensors 282 and/or an array of pressure sensing devices 284, as desired. These or similar devices are utilized to capture image information corresponding to a stream of disordered pieces of material to be singulated.

The captured image information is transmitted to a computer or microprocessor 286 where the information is interpreted and/or transformed through the use of preprogrammed algorithms. Alternatively, this data collection means by be replaced by the use of pallet layer placement information in conjunction with a data base.

As shown, singulator 274 is represented as an array of discreet points or locations 278, each of which correspond to a conveying means 20. The devices illustrated in FIGS. 14–21, and discussed in connection therewith may be advantageously utilized at each of the locations 278 as conveying means. Multiple devices of the type shown in FIGS. 13 and 22 may also be utilized as conveying means 20 in a similar fashion, however; it will be appreciated that these devices would be more accurately represented by longitudinally extending columns or zones.

Each conveying means 20 positioned at locations 278 may be discretely and intelligently controlled by microprocessor 286 so as to vary the boundary velocity 18 (FIGS. 1 and 7) across the singulator 274 and transform a disorganized stream of material into an orderly flow of single pieces separated by a controlled minimum gap as discussed in connection with FIGS. 1–12. Additional cameras 280 and/or sensors 282, 284 may also be used in connection with the singulator 274 to monitor and control the operation of the system. It will also be appreciated that while various belt and roller conveying devices have been disclosed in connection with the invention, it is contemplated that other material transporting devices may also be used, as well as variations of the belt and roller devices disclosed herein.

While the invention has been described in reference to illustrative embodiments, this description is not intended to be construed in a limiting sense. Various rearrangements of parts, modifications and combinations of the illustrative embodiments, as well as other embodiments of the invention, will be apparent to persons skilled in the art upon reference to the description.

What is claimed is:

1. A singulator, comprising:
    a conveyor having a plurality of rotary carriers for carrying items from an entry end towards an exit end of the singulator;
    a mechanism for selectively changing the speed of selected ones of said rotary carriers such that multiple items received at the entry end are removed one item at a time from the exit end of the conveyor;
    an item detection system that determines the positions of items on the conveyor;
    a control system that controls operation of the conveyor and the mechanism based on the item positions determined by the detection system according to a removal scheme, wherein the removal scheme comprises:
        (a) selecting a first item for removal,
        (b) increasing the speed of a first set of said rotary caters underlying the first item in order to transport the first item to the exit end; and
        (c) when a gap between the trailing edge of the first item for removal and a leading edge of a second item for removal reaches a predetermined size, increasing the speed of a second set of said rotary carriers underlying the second item in order to transport the second item to the exit end.

2. The singulator of claim 1, wherein said rotary carriers comprise a series of powered rollers independently controllable by the control system.

3. The singulator of claim 1, wherein said rotary carriers comprise a series of independently controllable powered belts.

4. The singulator of claim 1 wherein the speed of said rotary carriers underlying said first item is zero before being increased in step (b).

5. A singulator, comprising:
    a conveyor for carrying a group of items from an entry end towards an exit end of the singulator, the conveyor comprising a series of parallel belts running in a lengthwise direction of the conveyor;
    a mechanism for selectively actuating a portion of the conveyor at a dine to remove one item at a time from the exit end of the conveyor, the mechanism for selectively actuating the conveyor including a drive system for running each belt continuously and independently of other belts, and a mechanism for selectively lifting a portion of each belt into an operative position to engage an item while a remaining portion of the belt remains in a retracted position;
    an item detection system that determines the positions of items on the conveyor;
    a control system that controls operation of the conveyor and the mechanism for selectively actuating the conveyor in a manner effective to remove the group of items from the exit end of the conveyor one at a time based on die item positions determined by the detection system according to a removal scheme, wherein the removal scheme comprises:
        (a) selecting a first item for removal,
        (b) actuating a portion of the conveyor underlying the first item and between the first item and the exit end of the conveyor in order to transport the first item to the exit end;

(c) when a gap between the trailing edge of the first item for removal and a leading edge of second item for removal reaches a predetermined size, actuating a portion of the conveyor underlying the second item and between the second item and the exit end of the conveyor in order to transport the second item to the exit end; and (d) repeating steps (a)–(c) for additional items until all items in the group have exited the conveyor.

6. The singulator of claim 5, wherein the mechanism for selectively actuating the conveyor further comprises a rotatable shaft positioned beneath each belt, which rotatable shaft has a first portion, a second portion having a greater outer diameter than the first portion, and a cam surface spanning the first and second portions, which cam surface lifts portions of the associated belt consecutively starting with a portion nearest the exit end of the conveyor so that the lifted portions of the belt are lifted by the second portion of the shaft.

7. The singulator of claim 6, wherein each belt is wound in serpentine configuration over a series of rollers each supported by a roller frame, and the cam surface of the rotatable shaft associated therewith lifts the rollers and frames beneath the belt, whereby the portion of the belt supported thereon is lifted.

8. A singulator, comprising:

a conveyor including rotary carriers for carrying a group of items received at an entry end towards an exit end of the singulator such that the items are removed one at a time from the exit end;

an item detection system that determines the positions of items on the conveyor;

a mechanism for selectively actuating a portion of the conveyor at a time to remove one item at a time from the exit end of the conveyor based on the item positions determined by the detection system, which mechanism can actuate individual ones of the rotary carriers of the conveyor at different velocities form other ones of the rotary carriers; and a control system that controls operation of the conveyor and the mechanism for selectively actuating a portion of the conveyor in a manner effective to remove the group of items from the exit end of the conveyor one at a time according to a removal scheme.

9. The singulator of claim 8, wherein the rotary carriers comprise a series of powered rollers independently controllable by the control system.

10. A singulator, comprising:

a conveyor including rotary carriers for carrying a group of items from an entry end towards an exit end of the singulator, said rotary carriers comprising a series of parallel belts running in a lengthwise direction of the conveyor;

an item detection system that determines the positions of items on the conveyor;

a mechanism for selectively actuating a portion of the conveyor at a time to remove one item at a time from the exit end of the conveyor based on the item positions determined by the detection system, which mechanism can actuate rotary carriers or the conveyor at different velocities, said mechanism for selectively actuating the conveyor including a drive system for running each belt continuously, a mechanism for selectively lifting a portion of each belt into an operative position to engage an item while a remaining portion of the belt remains in a retracted position, and a support structure for supporting an item thereon out of contact with the belts when underlying portions of the belts are in a refracted position; and a control system that controls operation of the conveyor and the mechanism for selectively actuating a portion of the conveyor in a manner effective to remove the group of items from the exit end of the conveyor one at a time according to a removal scheme.

11. The singulator of claim 10, wherein the support structure comprises a plate having openings therein through which upper ends of each belt extend when such belt portions are in the operative position.

12. A singulator, comprising:

a conveyor including rotary carriers for carrying a group of items received at an entry end towards an exit end of the singulator such that the items are removed one at a time from the exit end;

said rotary carriers comprising a series of powered belts independently controllable by the control system;

an item detection system that determines the positions of items on the conveyor;

a mechanism for selectively actuating a portion of the conveyor at a time to remove one item at a time from the exit end of the conveyor based on the item positions determined by the detection system, which mechanism can actuate rotary carriers of the conveyor at different velocities; and a control system that controls operation of the conveyor and the mechanism for selectively actuating a portion of the conveyor in a manner effective to remove the group of items from the exit end of the conveyor one at a time according to a removal scheme.

13. A method of singulating a group of items, comprising:

carrying a group of items onto a singulator conveyor having a plurality of rotary carriers that move items longitudinally from an entry end towards an exit end of the singulator, said group of items being carded onto the conveyor as a batch;

selectively changing the speed of selected ones of said rotary carriers in order to remove one item at a time from the exit end of the conveyor;

determining the positions of items on the conveyor with an automated detection system;

controlling operation of said rotary carriers in a manner effective to remove the group of items from the exit end of the conveyor one at a time based on the item positions determined by the detection system according to a removal scheme, wherein the removal scheme comprises:

(a) selecting a first item (hr removal, (b) increasing the speed of a first set of said rotary carriers underlying the first item in order to transport the first item to the exit end; and (c) when a gap between the trailing edge of the first item for removal and a leading edge of a second item for removal reaches a predetermined size, increasing the speed of a second set of said rotary carriers underlying the second item in order to transport the second item to the exit end; and wherein no further items are carried onto the conveyor from the entry end until all items in the batch have exited the conveyor.

14. A method of singulating a group of items, comprising:

carrying a group of items onto a singulator conveyor having a plurality of rotary carriers that move multiple items received at an entry end towards an exit end of the singulator such that items are removed one at a time from the exit end;

selectively changing the speed of selected ones of said rotary carriers in order to remove one item at a time from the exit end of the conveyor;

determining the positions of items on the conveyor with an automated detection system;

controlling operation of said rotary carriers in a manner effective to remove the group of items from the exit end of the conveyor one at a time based on the item positions determined by the detection system according to a removal scheme, wherein the removal scheme comprises:

(a) selecting a first item for removal, (b) increasing the speed of a first set of said rotary carriers underlying the first item in order to transport the first item to she exit end; and (c) when a gap between the trailing edge of the first item for removal and a leading edge of a second item for removal reaches a predetermined size, increasing the speed of a second set of said rotary carriers underlying the second item in order to transport the second item to the exit end.

15. The method of claim 14, wherein a path between the first item for removal and the exit end of the conveyor is clear of other items.

16. An apparatus for selectively convoying items on a one-by-one basis, comprising:

a singulator, including means for creating a movable velocity boundary between an entry velocity and an exit velocity, the means extending the velocity boundary across a selected portion of the width and along a selected portion of the length of the singulator; and means for moving the velocity boundary past a selected item and accelerating the selected item relative to other items on the singulator to separate the selected item from the other items.

17. The apparatus of claim 16 wherein the ratio of the entry velocity and the exit velocity is fixed.

18. The apparatus of claim 16 including means for selecting an item to be advanced relative to other items on the singulator.

19. The apparatus of claim 16 further comprising an infeed conveyor, the infeed conveyor feeding a stream of items onto the singulator.

20. The apparatus of claim 16 further comprising means for obtaining boundary information for items conveyed across the singulator.

21. The apparatus of claim 16 further comprising means for determining the location of items on the singulator.

22. The apparatus of claim 16 further comprising means for controlling movement of the velocity boundary to create a gap between a first selected item and a second selected item as the first and second items are conveyed across the singulator.

23. The apparatus of claim 16 wherein the ratio of the entry velocity and the exit velocity is variable.

24. The apparatus of claim 23 wherein the entry velocity is variable.

25. A singulator comprising:

an array of conveying elements, each of the elements being independently controlled, the array providing a moveable velocity boundary between selected ones of the conveying elements;

means for determining the location of items conveyed by the singulator;

means for capturing boundary data for items conveyed by the singulator;

means for moving the velocity boundary to separate a selected item from other items on the singulator.

26. The singulator of claim 25 wherein the conveying elements comprise rollers.

27. The singulator of claim 25 wherein the conveying elements comprise conveyor belts.

28. A method of singulating a group of items, comprising:

carrying a group of items onto a singulator conveyor from an entry end towards an exit end of the singulator;

selectively actuating a portion of the conveyor at a time to move one item at a time from said group out the exit end of the conveyor;

determining the positions of items on the conveyor with an automated detection system;

controlling operation of the conveyor in a manner effective to remove the group of items from the exit end of the conveyor one at a time based on the item positions determined by the detection system according to a removal scheme, said items being carried onto the conveyor at the entry cad and exiting the conveyor from the exit end continuously, and the detection system continuously monitoring changes of item positions on the conveyor, wherein the removal scheme comprises:

(a) selecting a first item for removal, (b) actuating a portion of the conveyor underlying the first item and between the first item and the exit end of the conveyor in order to transport the first item to the exit end;

(c) when a gap between the trailing edge of the first item for removal and a leading edge of a second item for removal reaches a predetermined size, actuating a portion of the conveyor underlying the second item and between the second item and the exit end of the conveyor in order to transport the first item to the exit end; and (d) repeating steps (a)–(c) for additional items until all items in the group have exited the conveyor.

* * * * *

UNITED STATES PATENT AND TRADEMARK OFFICE
CERTIFICATE OF CORRECTION

| | | |
|---|---|---|
| PATENT NO. | : 6,629,018 B2 | |
| APPLICATION NO. | : 09/844691 | |
| DATED | : September 30, 2003 | |
| INVENTOR(S) | : Geroge R. Mondie, Gerald A. Isaacs and Homer L. Dickerson | |

It is certified that error appears in the above-identified patent and that said Letters Patent is hereby corrected as shown below:

Abstract:
Line 9, "hem" should be --item--.

Column 2:
Line 9, "provide" should be --provides--.

Column 5:
Line, 25, "filly" should be --fully--.

Column 9:
Line 63, Insert --.-- after "Ve".

Column 11:
Line 2, Delete --,-- after "Ve".

Column 12:
Line 23, Claim 1, "caters" should be --carriers--.
Line 46, Claim 5, "dine" should be --time--.
Line 60, Claim 5, "die" should be --the--.

Column 13:
Line 2, Claim 5, Insert --a-- after "of".
Line 38, Claim 8, "form" should be --from--.
Line 60, Claim 10, "or" should be --of--.

Column 14:
Line 2, Claim 10, "refracted" should --retracted--.
Line 37, Claim 13, "carded" should read --carried--.
Line 50, Claim 13, "hr" should be --for--.

Column 15:
Line 18, Claim 14, "she" should be --the--.
Line 28, Claim 16, "convoying" should be --conveying--.

UNITED STATES PATENT AND TRADEMARK OFFICE
CERTIFICATE OF CORRECTION

PATENT NO. : 6,629,018 B2
APPLICATION NO. : 09/844691
DATED : September 30, 2003
INVENTOR(S) : Geroge R. Mondie, Gerald A. Isaacs and Homer L. Dickerson It is certified that error appears in the above-identified patent and that said Letters Patent is hereby corrected as shown below:

Column 16:
Line 33, Claim 28, "cad" should be --end--.

Signed and Sealed this

Fourteenth Day of November, 2006

JON W. DUDAS
*Director of the United States Patent and Trademark Office*